United States Patent [19]

Shapiro

[11] Patent Number: 5,522,036
[45] Date of Patent: May 28, 1996

[54] METHOD AND APPARATUS FOR THE AUTOMATIC ANALYSIS OF COMPUTER SOFTWARE

[75] Inventor: Benjamin V. Shapiro, 4 Fairfield Ave., West Caldwell, N.J. 07006

[73] Assignee: Benjamin V. Shapiro, Parsippany, N.J.

[21] Appl. No.: 337,262

[22] Filed: Nov. 10, 1994

Related U.S. Application Data

[63] Continuation-in-part of Ser. No. 59,208, May 10, 1993.

[51] Int. Cl.$^6$ .................................................. G06F 11/00
[52] U.S. Cl. ........................................................ 395/183.14
[58] Field of Search ................... 395/183.14, 185.01, 395/185.02, 183.01

[56] References Cited

U.S. PATENT DOCUMENTS

| | | | |
|---|---|---|---|
| 4,720,778 | 1/1988 | Hall et al. | 364/200 |
| 4,853,851 | 8/1989 | Horsch | 364/300 |
| 5,297,150 | 3/1994 | Clark | 371/19 |

FOREIGN PATENT DOCUMENTS

| | | | |
|---|---|---|---|
| 62-166444 | 6/1987 | Japan | G06F 11/28 |
| 2-118852 | 5/1990 | Japan | G06F 11/28 |

OTHER PUBLICATIONS

Desmond, John "Software Recycling is Errico's Domain", Software Magazine, pp. 95–99, Nov. 1990.

*Primary Examiner*—Robert W. Beausoliel, Jr.
*Assistant Examiner*—Alan M. Fisch
*Attorney, Agent, or Firm*—Banner & Allegretti

[57] ABSTRACT

A method and apparatus for the analysis of a computer process is disclosed. The method consists of the steps of analyzing a target process and constructing a model and repository which are representative of the control and non-control components contained within the original target process respectively. The resultant model and repository are executed, and their execution is representative of the original target process. Structures created during the execution of the model and repository assist a user to identify failures which occur during the execution, and then locate the fault(s) responsible for the failures as well as places within the target process where modifications due to new requirements are needed. An alternative form of object code is proposed which consists of two components, control and non-control components. Previously described model representing the control component constantly increases the intelligence of the resulting object code in respect to the target process being executed through the processes of propagation of elementary knowledge about the correctness or uncertainty of the target process elements execution.

5 Claims, 27 Drawing Sheets

EXAMPLE:
IF (Q) S1, S2, S3
CAN BE REDUCED TO:
IF (Q.LT.0) GO TO S1
IF (Q.EQ.0) GO TO S2
GO TO S3
THAT IS:
IS REDUCED TO:
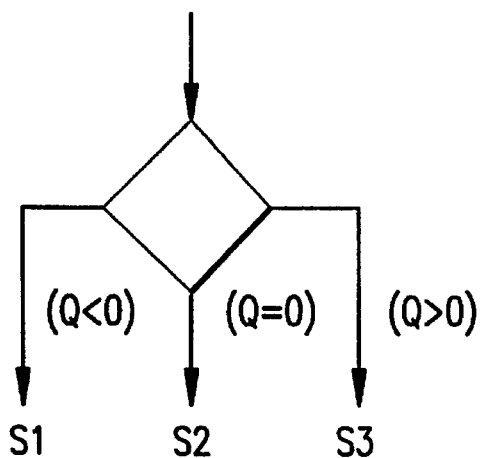
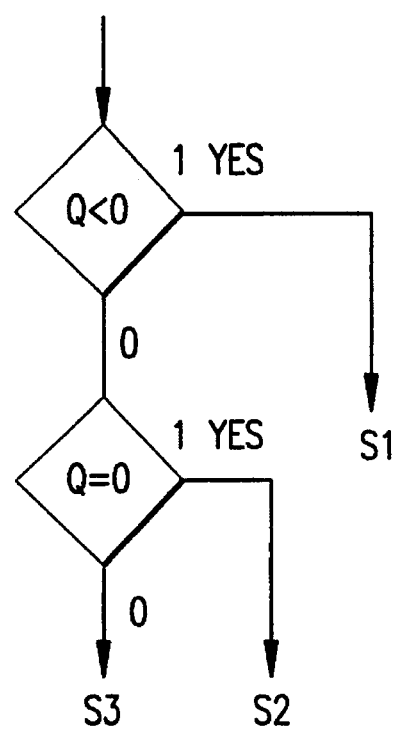
FIG.3

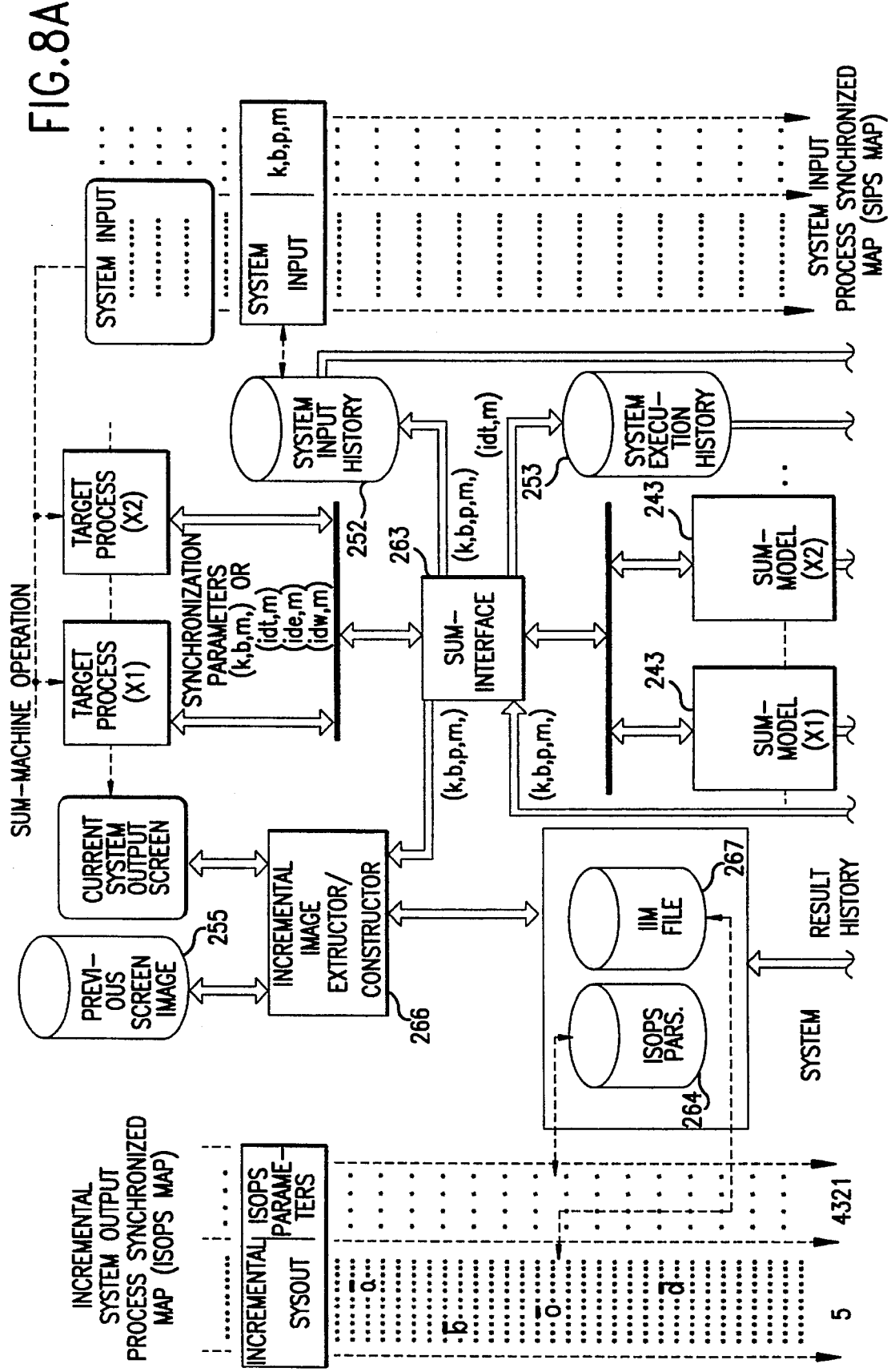

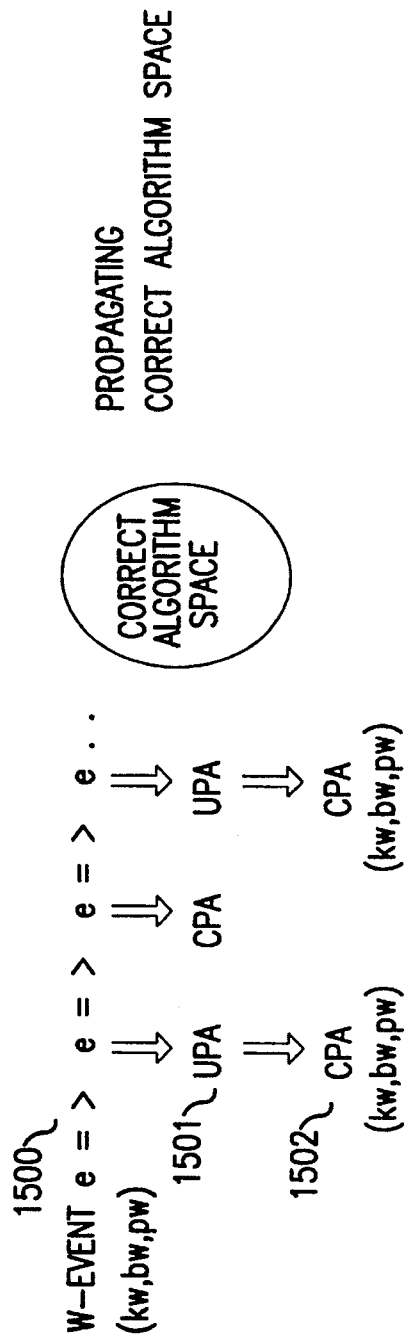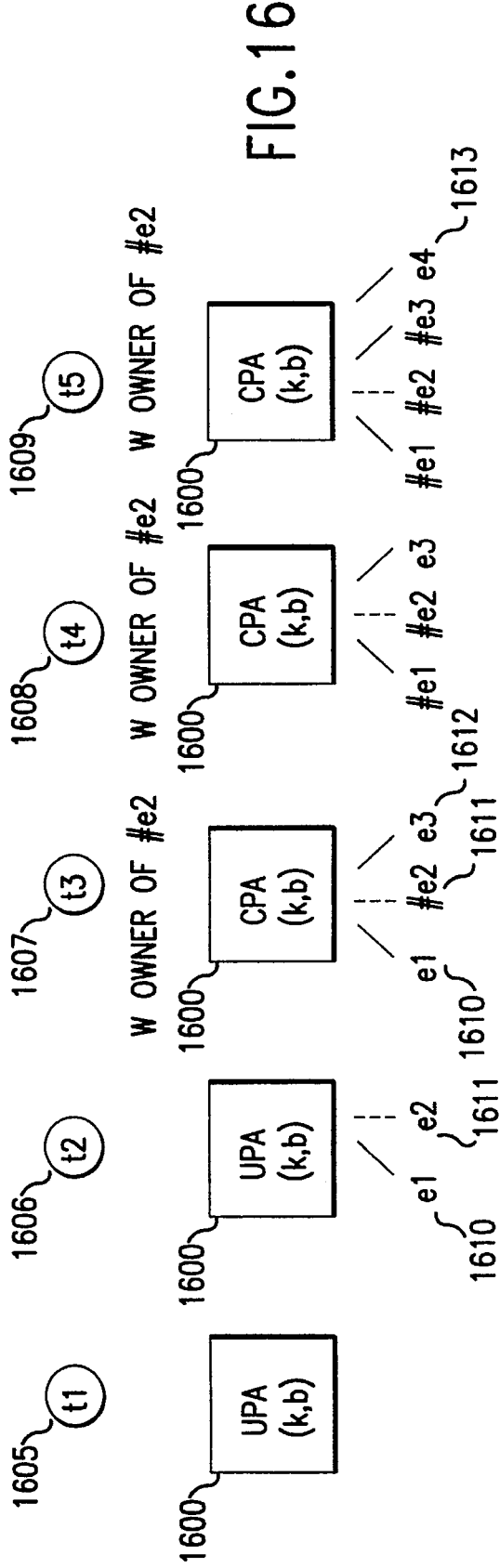

|                | CONTROL AREA | | INFORMATION AREA |
|---|---|---|---|
|                | NPW | UDW | |

```
            INTEGER IN(3)
            CHARACTER IA(3), IALF(10), CH
            DATA IALF/'0','1','2','3','4','5','6','7','8','9'/
001         FORMAT(3X,'IN(I)=',I3,'DOESNOT MATCH INTEGER FROM 0 TO 9',
            C' TYPE "Y" TO CONTINUE')
002         FORMAT(A)
D1:         I=1,3
D2:         J=1,10
L1:         IF(IN(I).EQ.J-1)
A1:         IA(I)=IALF(J)
W1:         WRITE(*,001)IN(I)
E1:         READ(*,002)CH
L2:         IF(CH.NE.'Y'.AND.CH.NE.'y')
```

```
      SUBROUTINE I2A(IN,IA)
      INTEGER IN(3)
      CHARACTER IA(3),IALF(10)
      DATA IALF/'0','1','2','3','4','5','6','7','8','9'/
      DO 10 I=1,3
         DO 55 J=1,10
            IF(IN(I).EQ.J-1)THEN
               IA(I)=IALF(J)
               GO TO 10
            ENDIF
55       CONTINUE
         WRITE(*,100)IN(I)                        ~2151
100      FORMAT(3X,'IN(I)=',I3,'DOES NOT MATCH INTEGER',
     C   'FROM 0 TO 9 TYPE "Y" TO CONTINUE')
         READ(*,20)CH                             ~2154
20       FORMAT(A)
         IF(CH.NE.'Y'.AND.CH.NE.'y')  [STOP]      ~2157
                                    ~2159
10    CONTINUE
      RETURN ~2161
      END
```

FIG.21A — 2100

```
      SUBROUTINE I2AXXX(IN,IA)
      INTEGER IN (3)
      CHARACTER IA(3),IALF(10)
      DATA IALF/'0','1','2','3','4','5','6','7','8','9'/
001   FORMAT(3X,'IN(I)=',I3,'DOES NOT MATCH INTEGER',
     C   'FROM 0 TO 9 TYPE "Y" TO CONTINUE')
002   FORMAT(A)
      DO 3001 I=1,3
         DO 3002 J=1,10
            IF(IN(I).EQ.J-1)THEN
               IA(I)=IALF(J)
               CALL SUMI(14,2)
               GO TO 23001
            ENDIF
            CALL SUMI (6,2)
3002     CONTINUE
         WRITE(*,001)IN(I)      ~2151
         CALL SUMI(20,2)        ~2152
         CALL SUMI(21,2)        ~2153
         READ(*,002)CH          ~2154
         WRITE(M,002)CH         ~2155
         IF(CH.NE.'Y'.AND.CH.NE.'y')THEN  ~2156
            CALL SUMI(31,2)
            STOP ~2157
         ENDIF
230010   CALL SUMI(24,2)        ~2158
3001  CONTINUE  ~2159
0     CALL SUMI(35,2)
      RETURN
      END
```

FIG.21B — 2150

ASSIGN 0 TO THE ACTIVE LOGIC LEVEL.
SET POSITION TO THE PROCESS ENTRY.

2310 — PASS THROUGH MAIN BRANCH
ASSIGN EACH STATEMENT TO SUM-OBJECT
STORE ASSIGNMENT IN SUM-REPOSITORY
IF LOGIC CONDITION
    TAKE LOW POTENTIAL SOLUTION
    INCREMENT ACTIVE LOGIC LEVEL BY 1
    REPRESENT OPENED LOGIC LEVEL IN THE
        FRAME BY OPENING PARENTHESIS
    START BUILDING 0 SUBFIELD BY REPEATING
        STEP 2310
2320 — ENDIF
IF REACHED PROCESS TERMINAL
    TERMINATE SEGMENT
    IF REWIND TERMINAL
        INSERT RETURN ENTRY AT CONTROL
            RETURN POSITION IN SUM-FRAME
        ASSIGN REWIND TERMINAL INDEX
    ENDIF
ENDIF
2330 — EXAMINE ACTIVE LOGIC LEVEL
IF ACTIVE LOGIC LEVEL = 0 THEN
    SUM-FRAME IS BUILT
    STOP
ELSE
2340 — EXAMINE CLOSED SUBFIELD
    IF CLOSED SUBFIELD = 0 SUBFIELD THEN
        INSERT "V" INTO THE SUM-FRAME
        START BUILDING 1 SUBFIELD BY
            POSITIONING AT THE HIGHEST
            POTENTIAL OF THE CORRESPONDING
            LOGIC CONDITION BY REPEATING
            STEP 2310
    ELSE
        CLOSE ACTIVE LOGIC FIELD BY PLACING
            PARENTHESIS WITH CORRESPONDING
            LOGIC LEVEL IN SUM-FRAME.
        DECREASE ACTIVE LOGIC LEVEL BY 1
        TREAT CLOSED LOGIC FIELD AS A
            PROCESS SEGMENT TERMINAL
        TERMINATE CORRESPONDING SEGMENT BY
            REPEATING STEP 2330
    ENDIF
ENDIF

FIG. 23

METHOD AND APPARATUS FOR THE AUTOMATIC ANALYSIS OF COMPUTER SOFTWARE

CROSS-REFERENCES TO RELATED APPLICATIONS

This application is a continuation-in-part of U.S. patent application Ser. No. 08/059,208 filed on May 10, 1993 by the same inventor.

BACKGROUND OF THE INVENTION

1. Field of the Invention

The invention relates generally to the field of fault identification and analysis in computer software. More particularly, the invention relates to a method and apparatus used for the automatic analysis of computer software.

2. Background of the Invention

Since the day the first computer program was written and to this day, errors or faults in computer software are an expected and commonplace occurrence. Even though such faults are expected, fault identification and analysis is a problem which has forever plagued programmers. This due in part, to the fact that the fault rate for a carefully constructed program can be about 5 faults per 1,000 lines of source code so that a one million-line program may contain 5,000 faults! Compound this with the fact that computer software faults are different from computer hardware faults in that the software faults do not obey the same simplified rules of proximity of cause and effect. That is to say, a computer software fault does not necessarily have to appear close to its failure, but instead can be located almost anywhere within a much larger software system. Therefore, even when a fault is known to exist, determining the origin and location of that fault is extremely difficult at best.

3. Description of the Prior Art

As a result of the above mentioned characteristics of computer software, the prior art has developed a number of methods and apparatus to assist a programmer in the development and analysis of software. The methods and apparatus of the prior art encompass a wide array of systems and techniques, each generally applicable to a different period of the overall computer software development process. Among these prior art methods and apparatus are: 1) structured design techniques; 2) language-sensitive development tools; 3) highly-efficient and informative language interpreters and compilers; and 4) an assortment of program profilers and debuggers and emulators which assist in identifying and locating faults in software during the debugging and testing of the software. Despite all these tools, techniques and related efforts, a large amount of programmer time is spent in trying to understand how a program works and many failures are tolerated out of fear of further "breaking" a software system.

There are many problems associated with existing tools and techniques for identifying and locating faults in computer software. Traditionally, a programmer had to debug or analyze a program through the use of some kind of "hook" or output statement which was part of the programming language used for the software program. For example, in one particular language a "PRINT" statement would be inserted by a programer into one or more locations of a program being analyzed so that upon encountering the PRINT statement, the program being analyzed would output to an appropriate output device the contents of some registers, variables, etc. In this manner, the programer would examine the output of the executed PRINT statement searching for clues as to why the program failed. Needless to say, this method of program analysis and debugging is very tedious for the programmer and error prone as well.

Another method of program debugging and analysis involves the use of a special program, known as a program debugger which monitors the execution of a software program and oversees its execution. Such debuggers typically offer enhanced flexibility and more information to the programmer than possible with the simple PRINT method, particularly with respect to a user interface presented to the programmer. Utilizing a debugger, a programer will normally specify one or more lines of the software program as "breakpoints", or points within a software program which when encountered suspend the execution of the program so that the programmer may examine processor registers or program variables. Breakpoints are not limited to specific lines of code, breakpoints may be used to interrupt execution when an expression changes value, or when a expression reaches a value. Despite apparent advantages over the PRINT method, program debugging and analysis using known tools suffer from many of the same infirmities i.e., they do not automate the understanding of cause-effect relationship between faults and failures (manifestation of fault).

The first problem associated with these above mentioned debugging and analysis methods and tools is where to begin. This is largely a hit or miss proposition for the programmer. Therefore, the programmer will typically insert a number of breakpoints or PRINT statements which are scattered throughout the program under test. As the programmer narrows down his understanding of the nature and location of program fault(s) responsible for a failure, unnecessary breakpoints or PRINT statements are normally removed or deactivated. This technique of randomly inserting breakpoints or PRINT statements throughout a program is highly inefficient, time-consuming, and error-prone.

Second, even if the programmer has some idea where within a program to place a breakpoint, the programmer must determine what to examine at that location. That is, a particular section of a program may use a large number of variables, registers or memory locations, thereby making the programmer's job of identifying the fault(s) more difficult. While debuggers and analyzers have certainly facilitated the examination of variables, registers or memory locations, they have by no means eliminated the problem of making a decision as to what variables, memory, or registers to examine and when to examine them. Furthermore, debuggers do not help to decide what is the meaning of the value of a variable and what other variables of what other statements need to be examined until the fault statement is found. As can be appreciated, the traditional techniques and tools used for debugging or analyzing a software program is not highly automated.

In an attempt to overcome these stated deficiencies in the art of program debugging and analysis, the prior art has developed additional tools and techniques.

U.S. Pat. No. 4,853,851, "System For Determining The Code Coverage Of A Tested Program Based Upon Static And Dynamic Analysis Recordings" issued to Horsch on Aug. 1, 1989 teaches a system for analyzing programs by measuring the degree of code coverage of a program being tested during specific test phases. The system disclosed utilizes a static and dynamic instruction flow indicator which permits a determination of the test cover results by correlating the data of the static and dynamic instruction flow. In this manner, the number of untested statements can be determined during a test phase of a computer program.

Although the more statements covered during the test of a program the better, the fact that a statement was executed does not provide any information on the statement validity. In particular, the statement may have been constructed wrong; the statement may be executed at the wrong place at the wrong time; or the statement may not contribute to the observed result.

U.S. Pat. No. 4,802,116, "Programmed Controller" issued to Ward, et al on Jan. 31, 1989 teaches programmed controller which controls a machine process and facilitates its debugging. The application programs disclosed are specifically designed to simulate specific control schemes for sections of the machine by being organized into one or more separate loops. A built-in control mechanism records the states of these loops along with the conditions responsible for the transitions between those states. This teaching is limited in application to only those processes that are specially coded by very specific syntax rules as consisting of independent loops, where the means of tracing the states of these loops are pre-coded in the programs controlling the process.

A theoretical approach to the general problem of program analysis was disclosed by Thomas J. McCabe in the article "A Complexity Measure" published in IEEE Transactions on Software Engineering, Vol. Se-2, No. 4, December 1976, pp. 308–320. Cyclomatic Complexity was proposed in this article as a measure of program complexity. This measurement is nothing more than the number of independent passes within a subroutine. This complexity measurement is useful to promote the design of less sophisticated software routines which are also easier to test. However, counting the number of independent passes does not eliminate their necessity.

Despite these and other attempts made by the prior art, software debugging and analysis remains a difficult, time-consuming and error prone process. A critical shortcoming in the prior art is that there are no teachings for general methods or apparatus which are capable of automatically determining the location of logic faults in software programs even within a broad area of a program. This is due, in large part, to a general belief which exists in the art that such automation is not possible because software does not conform to the rules of proximate cause and effect and that a software program has no knowledge of what results are expected of it unless those expected results are pre-coded within the program. Such pre-coding is itself programming and therefore is also error-prone.

Therefore, a continuing need exists in the art for a method and apparatus which more highly automates the chore of software program debugging and analysis.

SUMMARY OF THE INVENTION

It is therefore the object of the present invention to provide a method and apparatus which automates the process of program debugging, analysis and maintenance by allowing for automatic identification of an area of a program containing fault(s) responsible for specific failure or containing statements to be modified due to the new requirements.

The invention thus presents the advantage that the method and device for debugging and analyzing software programs does so with precision that grows with the accumulation of knowledge about the target or analyzed program behavior.

The invention successively accumulates this knowledge, and utilizes it to determine correct or uncertain behavior of the analyzed software program. The invention further shows the ability to partially "unlearn" previously acquired knowledge, thereby recognizing that correct results are a function of a user's expectations of the results which may change over time.

The invention operates by analyzing the results or effects produced by a software process and automatically races back from these effects to their cause(s). In this manner failures, which are unexpected results, are automatically traced back to the fault(s) responsible. This is in contrast to traditional methods, i.e., stepping forward through the software process to precipitate a failure. The analysis is accomplished by the invention of the present application by first building a model of the software process under analysis on the basis of a static analysis performed under a set of strict rules. The model is constructed such that it serves as a framework for the further accumulation of knowledge which is acquired through a dynamic analysis of the software process.

The invention constructs the model of the target software process in such a manner that allows for the automatic determination of accessibility, or presence of a path, between any two elements of the target software process. Accessibility is required for dependency, that is, if one statement within a software process is accessible from another statement within the process, then, and only then, the correctness of the other statement may affect the behavior of the one statement under examination. If the second statement is not accessible from the first statement, then correctness/incorrectness of the first statement cannot affect the behavior of the second statement and therefore the second statement is not dependent upon the first statement.

During the construction of the model of the target software process, the invention extracts the control component of the target software process into a form which represents a control structure of that target process. Furthermore, the invention accumulates information about the behavior of the target software process thereby permitting the invention to determine the correctness of a software process element relative to the time at which the element is executed. Still further, this accumulated correctness runformation is propagated between target process elements istatements) thus automatically increasing the intelligence of the target process model. Through this accumulated knowledge that the invention acquires about the correctness of the software process behavior, the invention is able to automatically determine the location of fault(s) responsible for a failure.

These resources maintained by the inventive software analyzer are presented to the user in an easy-to-use implementation. The preferred embodiment makes extensive use of an intuitive user interface as well as multimedia capabilities known in the art to further facilitate software debugging and analysis.

It is still another object of the present invention to introduce an original form of the target process object code, SUM-Object code, and a method for its execution. The SUM-Object code is more suitable for program analysis, both static and dynamic and for program maintenance. It eases and sometimes eliminates the traditional recompiling and re-linking of the target process code which is necessary after modifications are made to the target process. The SUM-Object code comprises the model extracted from the target process. Therefore, increasing the intelligence of the model also increases the intelligence of the SUM-Object code.

BRIEF DESCRIPTION OF THE DRAWINGS

The teachings of the present invention can be readily understood by considering the following detailed description in conjunction with the accompanying drawings, in which:

FIG. 3 shows how complex logic conditions are reduced into two or more reduced logic conditions.

FIG. 15 shows the propagation of correct algorithm space.

FIG. 16 shows the accumulation of knowledge about time correctness of a process element located within a specific process address.

FIG. 19 shows the construction of an analyzed calculation base.

FIG. 21 shows a sample process and its SUM-Source code.

FIG. 23 is a pseudocode listing which describes the steps for creating the SUM-Frame of the target process by the next lowest potential method or rule.

To facilitate understanding, identical reference numerals have been used, where possible, to designate identical elements that are common to the figures.

DETAILED DESCRIPTION OF THE PREFERRED EMBODIMENT

After considering the following description, those skilled in the art will clearly realize that the teachings of this invention can be readily utilized in the analysis of software programs or processes.

Figure 24:
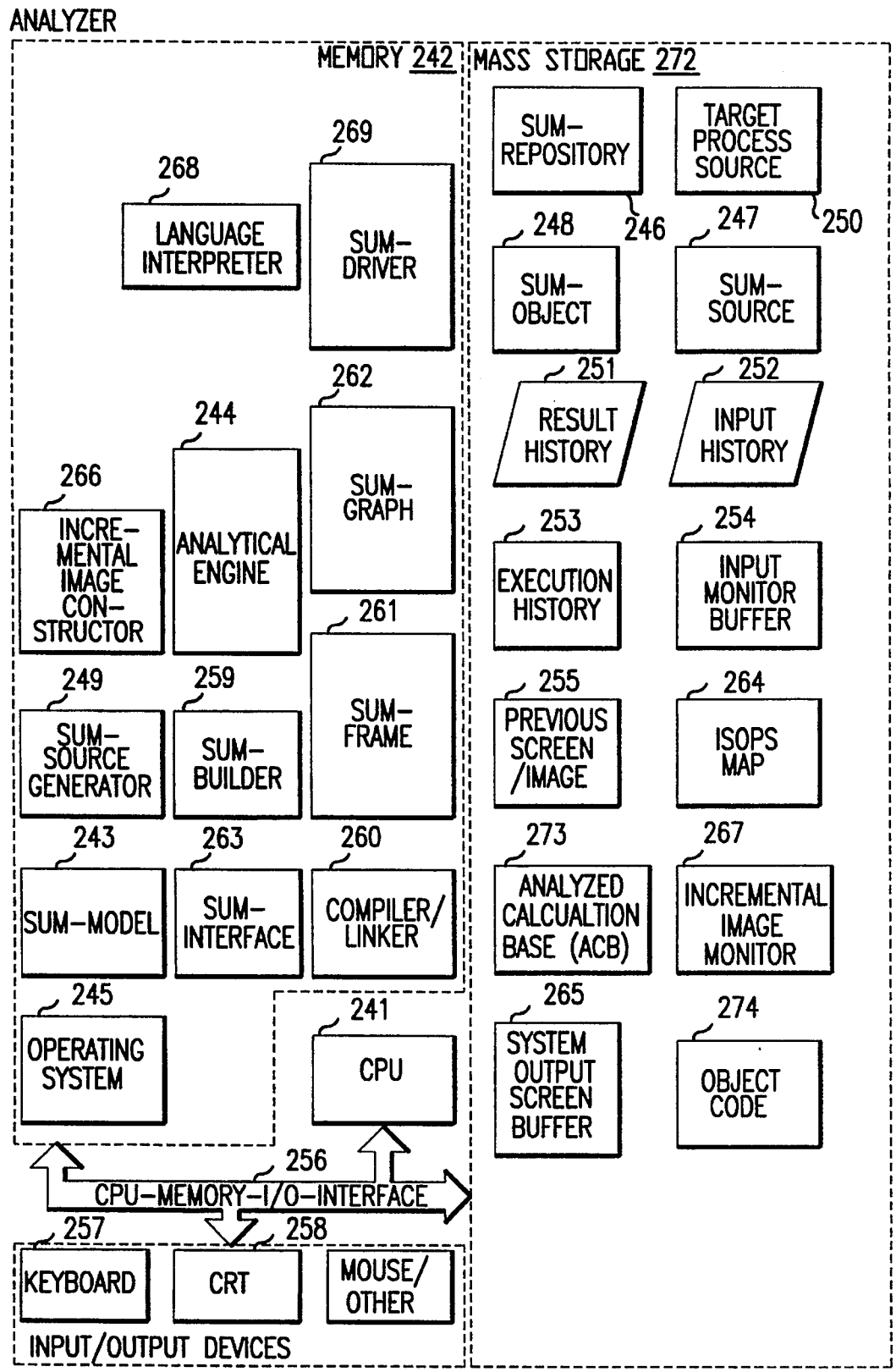
FIG. 24 is a system block diagram showing the overall analysis system and the components parts which it comprises.

FIG. 24 is a block diagram of the SUM (Software Understanding Machine) analysis system 240 which comprises the present invention. Some of the elements contained within the analysis system are well known in the art as they are typically found in conventional personal computers. Well known components of the analysis system includes, keyboard 257, a CRT display 258, CPU 241, memory 242, and some form of mass storage facility 272 (e.g., a hard disc drive). These systems communicate via and are frequently capable of receiving a wide array of options via CPU-memory-input/output interface 256.

Of course, it should be apparent that the various software components of the present invention can reside on various hardware components, and that the distribution of the software components is frequently controlled by the operating system.

A target software process 250 is defined by a target source program comprising one or more program statements. The target source is typically stored on mass storage device 272. The SUM-Builder 259 examines the target process 250 and constructs an SUM-Graph 262 of that target process 250.

An SUM-Repository 246 of the target process is built by the SUM-Builder 259 at the same time the SUM-Graph 262 is constructed. The SUM-Repository 246 so constructed is "control-less", in other words, it does not contain any process control statements which were present in the target process 250. Instead, process control information hs preserved within the SUM-Model 243.

The SUM-Model 243 built by the SUM-Builder 259 on the base of the SUM-Graph 262 comprises one or more elements, each element corresponds to an executable statement of the target process 250. In one embodiment of the present invention, multiple SUM-Models 243 are constructed when the target process 250 comprises multiple components, i.e., main, subroutines, functions, etc.

After the SUM-Model 243 and SUM-Repository 246 are Duilt, SUM-Source Generator 249 constructs SUM-Source code 247 from the information contained within Model 243 and SUM-Repository 246. The SUM-Source 247 is representative of the original target process 250, since it is constructed from SUM-Model 243 and SUM-Repository 246 which in turn, were constructed from the target process 250.

The SUM-Source 247 is only created when SUM 240 is used in its traditional object code embodiment. The SUM-Source 247 permits the SUM 240 to operate with the traditional, object code representation of target process 250, which should be very familiar to those skilled in the art. The SUM-Source 247 so constructed contains synchronization signals, i.e., CALL() statements or WRITE() statements or other means of communicating to SUM-Interface 263 a message from the target process 250 which are inserted into SUM-Source 247 by SUM-Source Generator 249.

The synchronization CALL() statements reference the SUM-Interface library 263. The SUM-Source code 247 is compiled by compiler/linker 260 and the resulting code is linked with SUM-Interface library 263 thereby resolving the CALL() references. The output code produced by the compiler/linker 260 operating on SUM-Source code 247 and SUM-Interface library is then executed by CPU 241. During the execution of this code, the synchronization statements embedded into SUM-Source and now compiled/linked, are executed which, in turn invoke the execution of Analytical Engine 244. The creation of SUM-Source 247, compiling/linking it with SUM-Interface library and sending synchronization signals to the SUM-Model is not done in the embodiments utilizing the SUM-Object code or in embodiments utilizing a language interpreter 268 operating on SUM-Repository 246. In those last two embodiments the SUM-Model 243 controls the execution of the target process.

In a first embodiment utilizing traditional object code and upon receipt of a later synchronization signal, Analytical Engine 244 traces the SUM-Model 243 from the point at which a previous synchronization signal was received up to the position within the SUM-Model 243 where the later synchronization signal was received. In this manner, the Analytical Engine 244 effectively "models" the target process.

Additionally, the Analytical Engine 244 constructs the Analyzed Calculation Base (ACB) 273 by tracing effects to their cause(s) which process is described in this invention as the Knowledge Induction Process. In this manner, the knowledge about the correctness or its uncertainty of one statement execution event is propagated backwards in the target process time to affect the knowledge of the correctness/uncertainty of another statement execution event. The ACB comprises Analyzed Calculation Words (ACW) which describe the knowledge of the correctness/uncertainty of target process elements (statements) as a function of time.

System Execution History, 253, System Input History 252, System Result History 251, Input Monitor Buffer 254 and Previous Screen Image 255 are all produced during the execution of the Analytical Engine. These structures will be described in greater detail later in this description.

The system receives user input through keyboard 257 or other input device and informs the user of analysis results and/or progress via CRT 258.

Figure 1:
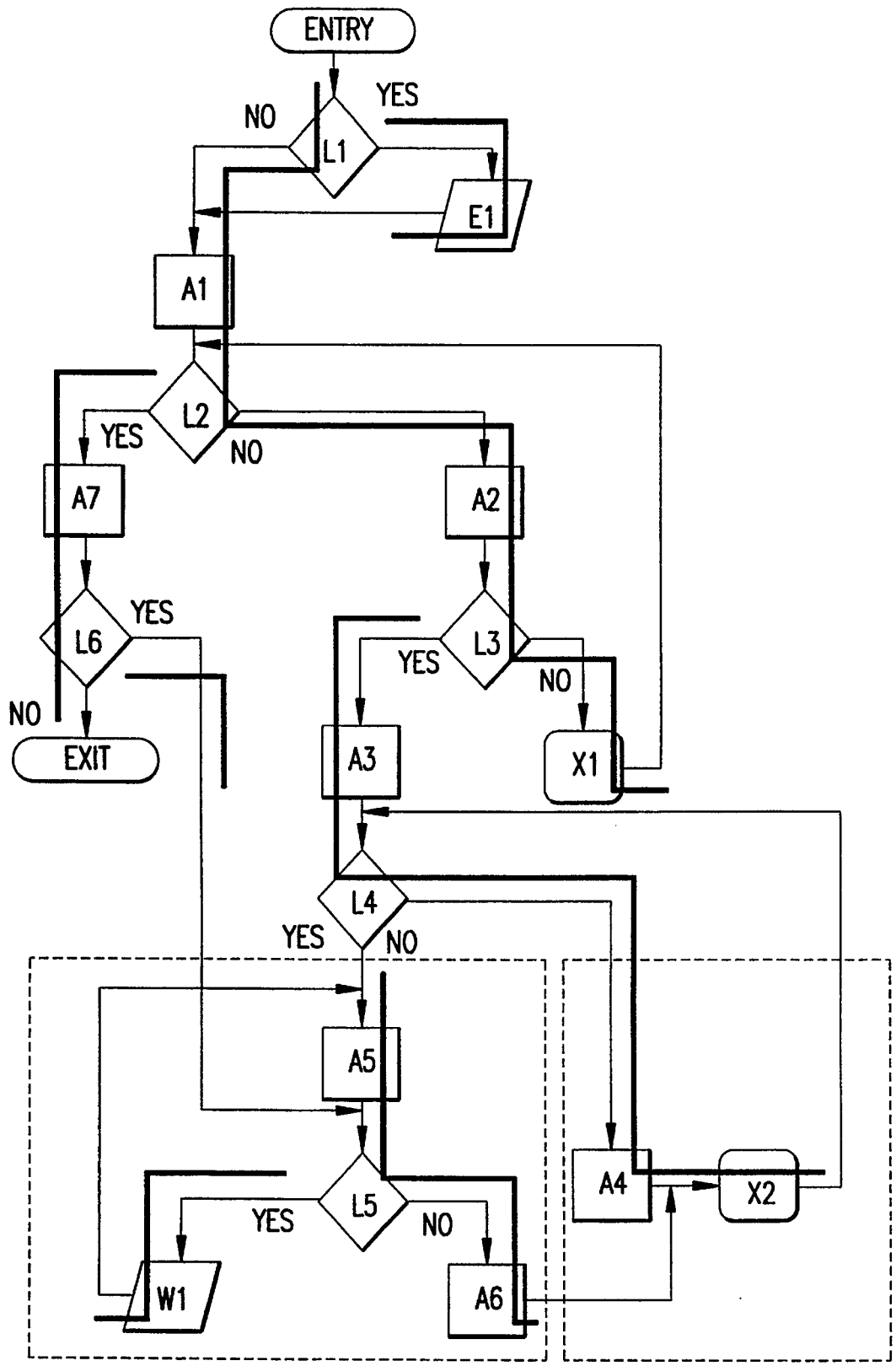
FIG. 1 shows a flow chart of a sample target process.

FIG. 1 is a flow chart representing a sample target source process 250 that is a single module although our results can be easily extended to a process comprising a system of modules. The module could be either a main program or a single subprogram (i.e., subroutine, function, or paragraph) with one entry point. Although the example shown has only a single exit, the invention will work in an identical manner for modules with multiple exits. Those skilled in the art could readily extend our teachings to accommodate modules having multiple entry points.

Figure 2:
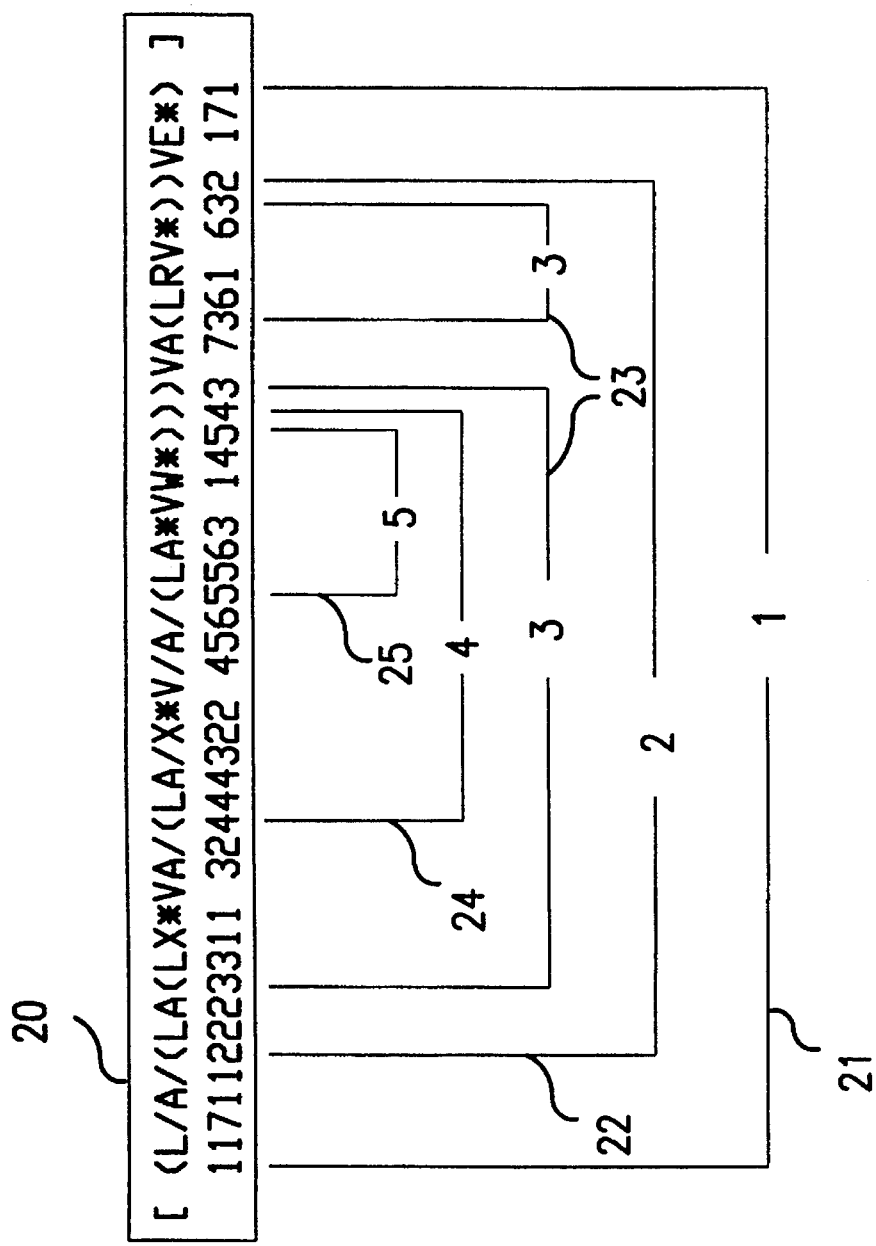
FIG. 2 shows an SUM-Frame of the sample target process of FIG. 1.

During the initial examination of target source 250 by SUM-Builder 259, SUM-Model 243 may be built from two predecessor structures, SUM-Frame 261 and SUM-Graph 262. A representative SUM-Frame, so constructed from the target source 250 is shown in FIG. 2.

In the following description of the construction of the SUM-Frame, the below given designations and definitions will be used:

TABLE 1

SUM-Object Set

| Designation | Object | Example |
| --- | --- | --- |
| Process Entry | [ | |
| Process End | ] | |
| Arithmetic or Assignment Statement | A | |
| Function Call other than Graphics Library | X | CALL, PERFORM |
| IF statement | L | |
| Loop Statement | D | DO, WHILE, FOR |
| User Input Statement | E | READ |
| System Output Statement | W | WRITE ( ); CALL MOVETO (x,y,xy) |
| Null Statement | N | |
| Stop | = | STOP |
| Return | R | RETURN |
| Unconditional Branch | * | GO TO |
| Loop Terminal Statement | C | CONTINUE; ENDDO |
| Assigned GO TO | + | |
| ASSIGN | S | |
| Entry of GO TO | / | |
| ENDIF | ! | |
| Opening of Logic Condition | ( | |
| Closing of Logic Condition | ) | |
| Conditional Alternative | V | ELSE; OR |

Definition F1: A Reduced Logic Condition (LC) is a process element with one control input and two control outputs. One of the two control outputs are assigned to Boolean 0 (False) and the other control output is assigned to Boolean 1 (True) which correspond to a solution to the logic condition.

Definition F1.1: The Low Potential Solution of a ogic condition is the "0" Boolean solution (False) to the logic condition.

Definition F1.2: The High Potential Solution of a logic condition is the "1" Boolean solution (True) to the logic condition.

Definition F2: The Process Terminals are comprised of the following members of the SUM-Object set shown in Table 1: *, +, C, R, =.

Definition F3: The Main Branch of a process is the path traversed through a process from an origin of the main branch (process entry or high potential solution of logic condition) to a process terminal when all of the logic conditions which comprise that path are passed through their low potential solutions.

Figure 9:
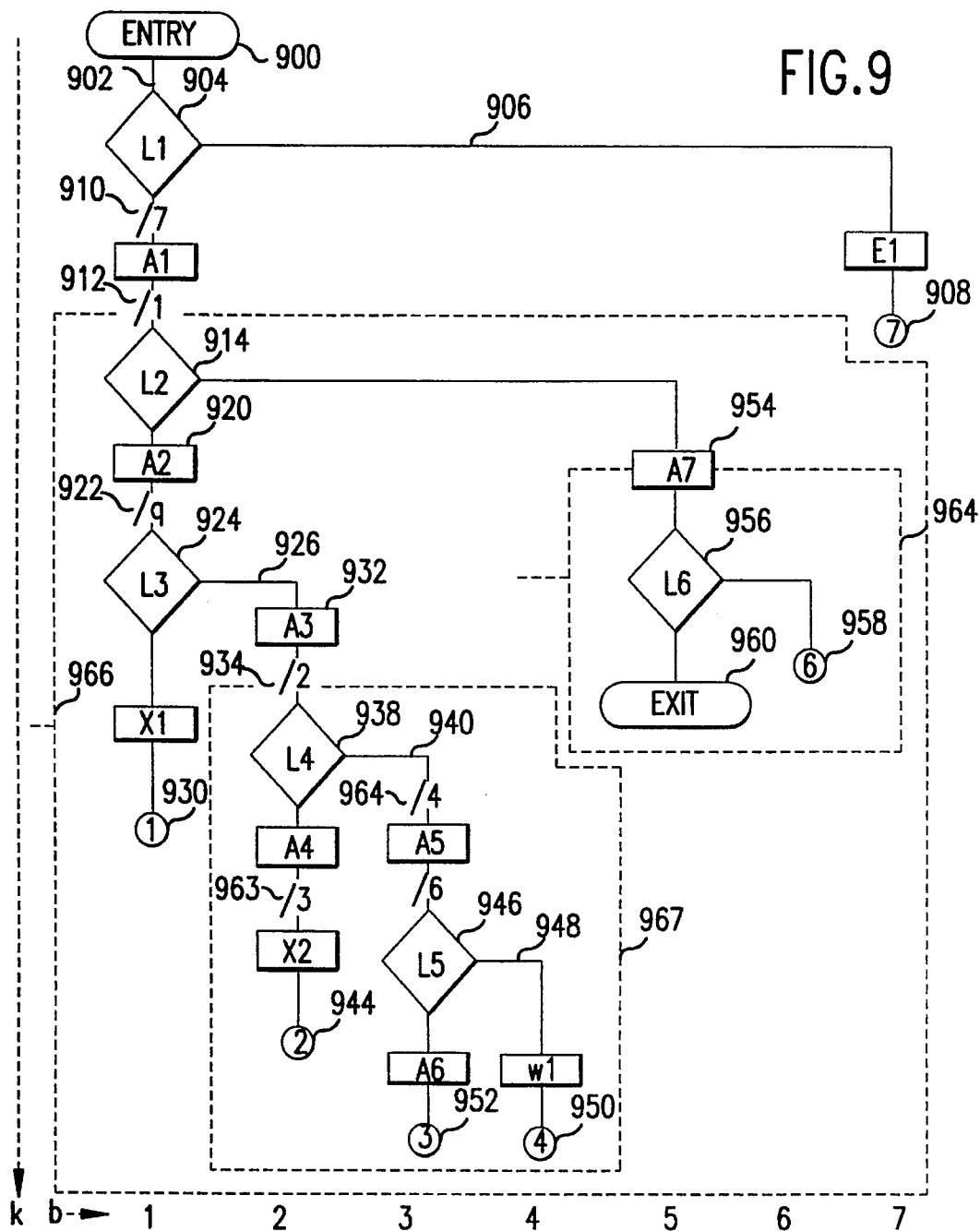
FIG. 9 shows the construction of exit access ndicators and the construction of propagated vision points.

Referring to FIG. 9, the Main Branch is the path from entry 900, through logic conditions 904, 914 and 924, until terminal 930 is reached.

Definition F4: Exit Terminals result in an exit from a process and are comprised of the following members of the SUM-Object set shown in Table 1: R, =. As shown in FIG. 9, terminal 960 is an exit terminal.

Definition F5: Rewind Terminals are terminals that rewind the process to an element that is in the same main branch or in a main branch to the left of the current main branch. An exception to this rule is when the rewind terminal is an exit of a loop. In such a case, the rewind terminal could reset the process to an element that is within a branch located to the right of the current branch. As shown in FIG. 9, terminals 908, 930, 944, 950, 952 and 958 are all rewind terminals.

Definition F6: A t-pass is a pass from the process entry to the process terminal. In any process there are (n+1) t-passes, where n is the number of logic conditions in the process. Each t-pass is uniquely identified by its terminal.

In FIG. 9 there is shown a single entry 900, and seven terminals; 908, 930, 944, 952, 950, 960, and 958. Of those seven, 930, 944, 952, 950, 958, and 908 are all rewind terminals while terminal 960 is an exit terminal. Shown further in FIG. 9 are six logic conditions; 904, 914, 924, 938, 946 and 956. A single t-pass would be represented by entry at 900, progressing along line 902, taking the high potential path from logic condition 904 along line 906 until terminal 908 is reached. This t-pass would be uniquely identified as, for example, t-pass 908 where 908 identifies the terminal of the t-pass.

Definition F7: A branch of a logic condition is that part of a t-pass which begins at that logic condition. Each logic condition has at least one 0-branch and at least one 1-branch. Referring once again to FIG. 9, a high-potential or 1-branch of logic condition 904 is represented by line 906 and terminates at terminal 908. A high-potential or 1-branch of logic condition 914 is represented by all of the independent paths contained within dotted block 964.

Three of the four elements contained within dotted block 964, namely 954, 956, and 960, constitute a main branch of logic condition 914. The other element contained within dotted block 964, namely 965, constitutes a main branch of logic condition 956. The combination of all the main branches of a process necessarily and sufficiently represent all the elements which comprise that process. Further, there could exist many paths through a process element but that process element can belong to only one main branch.

Definition F8: The 0-subfield of a logic condition is a combination of all elements situated on the 0-branch(es) of that logic condition.

Definition F9: The 1-subfield of a logic condition is a combination of all elements situated on the 1-branch(es) of that logic condition.

Definition F10: The field of a logic condition is a combination of the 0-subfield and 1-subfield of that logic condition.

Definition F11: The level of the logic condition field or logic level, is the numeric order in which that logic condition was encountered in the t-pass going through the logic condition.

Referring once again to FIG. 9, logic condition 904 is situated at logic level 1. Logic condition 914 is situated at logic level 2. Logic conditions 924 and 956 are both situated at logic level 3 and logic condition 938 is situated at logic level 4.

Definition F12: A process segment is that part of a main branch which is positioned between process entry, process terminals and logic conditions.

Process terminals and logic conditions terminate process segments. They belong to the segments that they Uerminate. Each logic condition has at least one 1-branch and at least one 0-branch.

An SUM-Frame is constructed in the present invention by representing the main branches of the target process in a special order along with the logic conditions whose corresponding level(s) and fields are specified in the SUM-Frame.

Construction of the SUM-Frame

Figure 22:
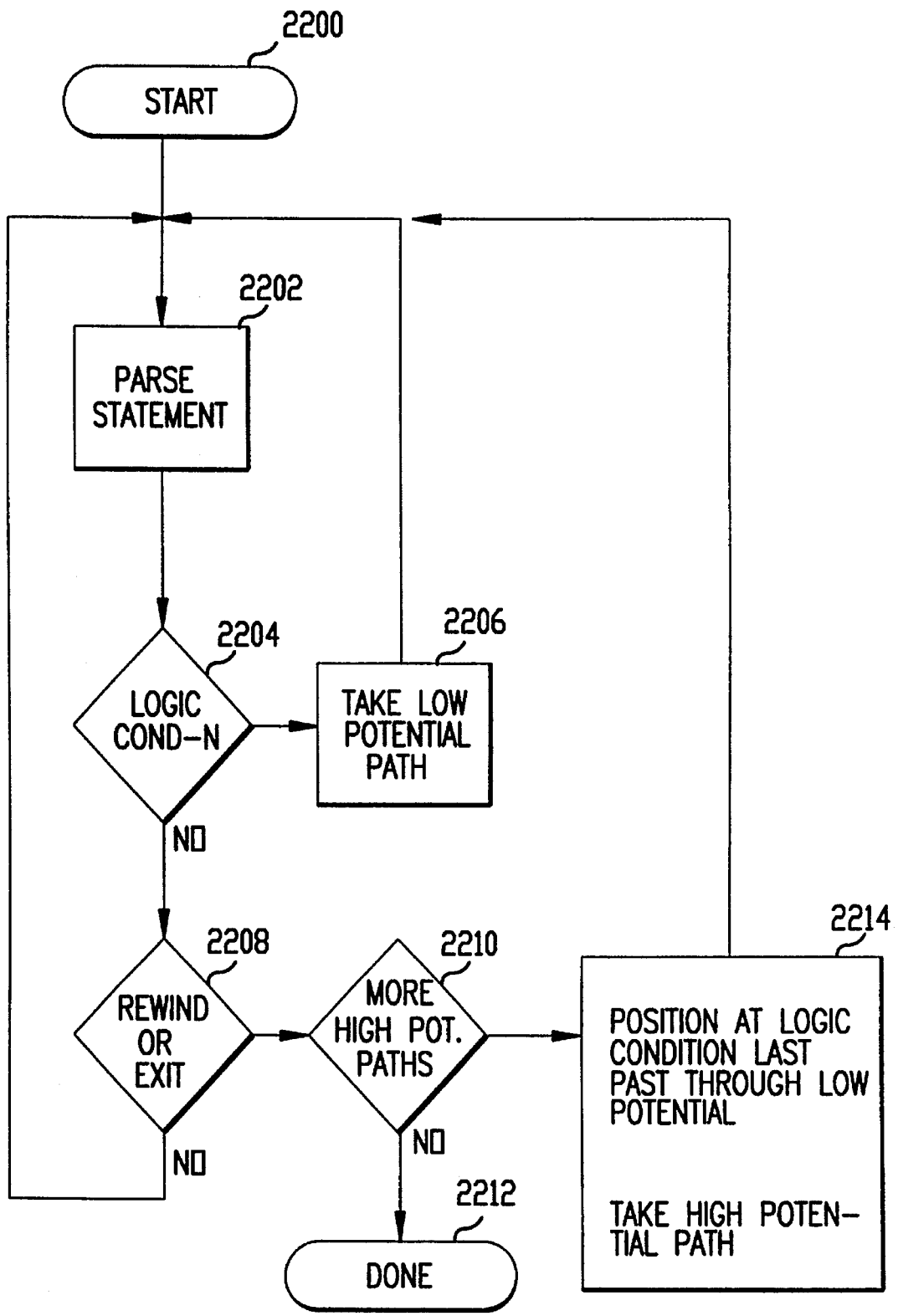
FIG. 22 is a flow chart depicting the steps which comprise the Next Lowest Potential method or rule.

The first step performed by SUM-builder 259 is the construction of the SUM-Frame which is representative of the target process 250. This step is not needed if the SUM-Graph is constructed directly from the target process. The target process is processed by the SUM-Builder through the "Next Lowest Potential" rule or alternatively, through the complementary "Next Highest Potential" rule. FIG. 22 is a flow chart depicting the steps associated with the analysis of a software process by the next lowest potential rule. The analyzer proceeds by beginning its analysis at start block 2200. Successive statements of the process are parsed by block 2202 until a logic condition or process terminal is met. If a logic condition is met as determined by block 2204, the low potential solution of this logic condition is taken as dictated by block 2206. When a rewind or exit terminal is encountered as determined by block 2208 and untraversed high potential paths remain in the software process 2210, the Sum-Builder locates the logic condition that was last passed through its low potential solution and which high potential path was not yet taken, and its high potential path is then taken 2214. The analyzer then proceeds with the analysis via block 2202. These steps repeat until all of the high potential paths through the software process being examined are traversed by the analyzer.

By way of additional disclosure and to provide the reader with additional clarity, FIG. 23 is shows a PSEUDOCODE implementation of the steps involved in analyzing a target software process by the next lowest potential rule. Additionally, FIG. 23 shows at what points within the steps modifications are made to the SUM-Frame under construction and at what points in the process statements are stored in the SUM-Repository.

FIG. 2 shows an SUM-Frame 20 which was constructed from the flow chart of a target process shown in FIG. 1 by the next lowest potential rule. By inspection of FIG. 2, the reader can readily see that the SUM-Frame 20 is built in the form of an algebraic expression containing several levels of parenthesis. In SUM-Frame 20, the parenthesis are representative of the logic levels. The same general rule is applied to this SUM-Frame 20 that applies to any algebraic expression, that is, the lower (outer) level logic field cannot be closed until the higher (inner) level logic field is first closed.

Referring once again to FIG. 2, the different levels of SUM-Frame 20 become apparent. Dotted line 21 identifies that portion of SUM-Frame 20 which is the first level. Line 22 represents the second level. Dotted lines 23 show the third level. Dotted line 24 shows the fourth level and dotted line 25 shows the fifth level.

The labeling of the target process elements which are represented within the SUM-Frame 20 proceeds using the SUM-Object set members previously defined. Table 2 shows the SUM-Object set members and their respective segment that are inserted into the SUM-Frame during its construction.

TABLE 2

| Process Segment | SUM-Object Set Representation |
|---|---|
| 1 | L1 |
| 2 | /7, A1, /1, L2 |
| 3 | A2, L3 |
| 4 | X1, *1 |
| 5 | A3, /2, L4 |
| 6 | A4, /3, X2, *2 |
| 7 | /4, A5, /6, L5 |
| 8 | A6, *3 |
| 9 | W1, *4 |
| 10 | A7, L6 |

TABLE 2-continued

| Process Segment | SUM-Object Set Representation |
|---|---|
| 11 | R1 |
| 12 | *6 |
| 13 | E1, *7 |

Figure 5A:
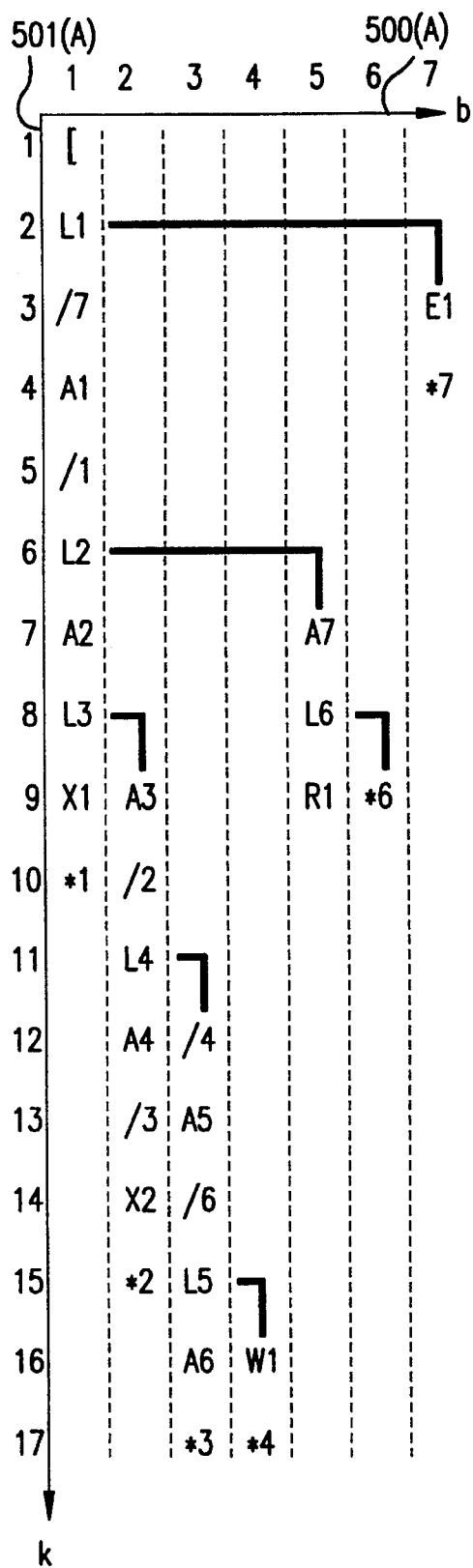
FIG. 5. shows SUM-Graph of the sample target process shown in FIG. 1 and the SUM-Binary addresses assigned to the corresponding elements of the SUM-Graph.

Upon completion of the construction of the SUMFrame 20, an SUM-Graph is built by the SUM-Builder 259. An SUM-Graph of target process 250 shown as a flow chart in FIG. 1, is shown in FIG. 5(A). The SUM-Graph is constructed along two perpendicular axis which are designated as k and b in the graph and are referenced by 501(A) and 500(A) respectively. The origin of the two perpendicular axis is at the top-left of the graph.

Main branches of the graph are directed vertically down and represent tracks by which the target process 250 execution progresses, unless the track is switched as the result of the high potential solution to a logic condition encountered in the track. As shown in FIG. 5(A), every track has a unique b coordinate. Every track of the graph is parallel to one another.

The graph is constructed and populated such that an SUM-Object set member representative of the target process 250 is inserted at appropriate k,b coordinate(s). For example, as shown in FIG. 5(A) at k,b coordinate 1,1 there is placed an SUM-Object set member '[' (left brace) which is indicative of a process entry as defined previously in Table 1.

Figure 4:
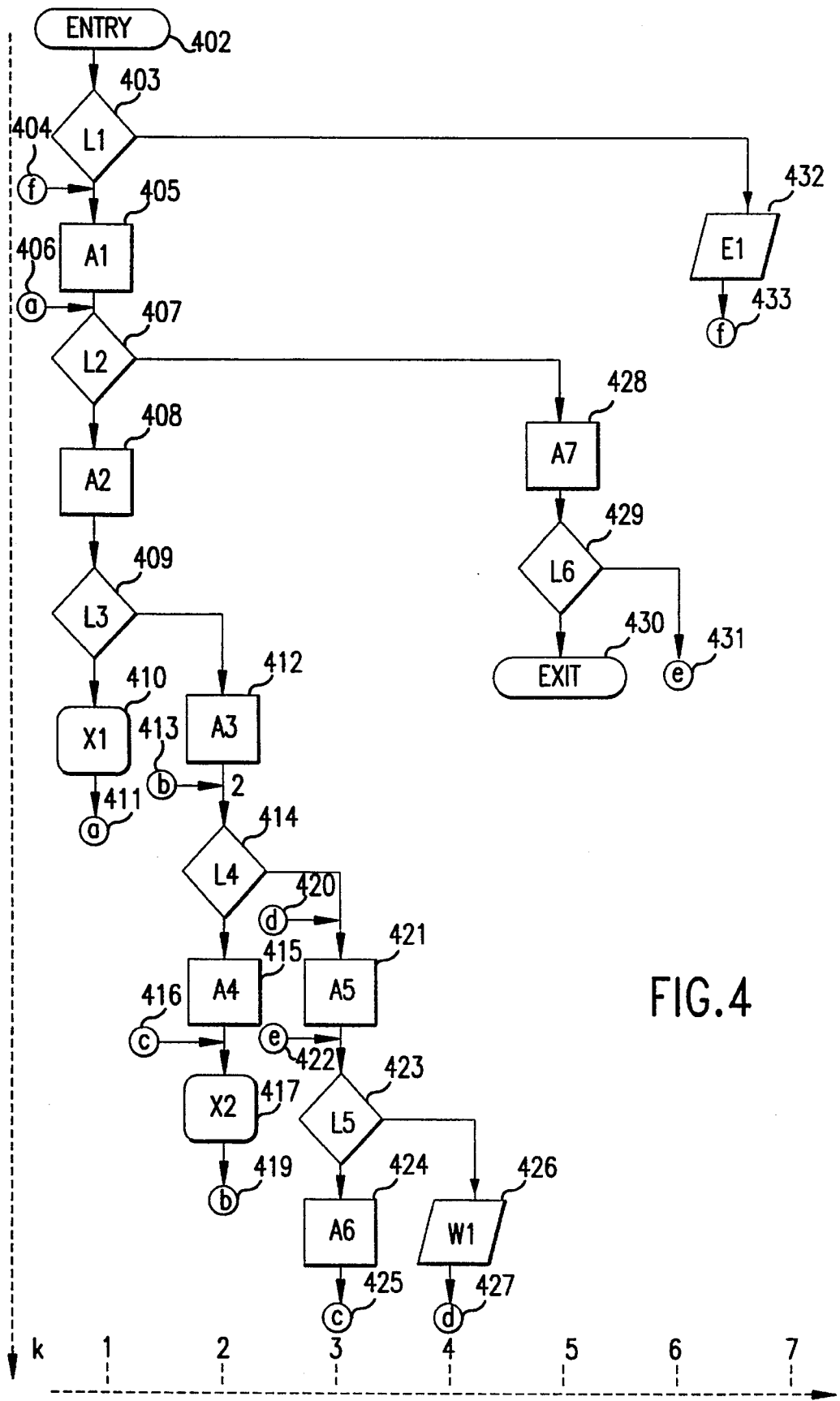
FIG. 4 shows a reduced flow chart of the sample target process shown in FIG. 1.

In the following description of the construction of the SUM-Graph, the below given designations and definitions will be used:

Definition G1: A Reduced Flow Chart is an SUM-Graph represented in the form of a flow chart. FIG. 4 shows a reduced flow chart for the target process represented by the flow chart of FIG. 1.

A reduced flow chart is presented along two perpendicular axis, k and b which are shown as 401 and 400 in FIG. 4, respectively. The origin of the two axis is at the top-left-most portion of the chart. The k axis increases as one proceeds down the chart and the b axis increases as one proceeds to the right of the chart.

All possible changes in the direction of control is reduced to one—to the right as the chart is traversed. In this manner, all high potential solutions to a logic condition are represented as a shift to the right in the graph. Only backward (up and left) jumps of unconditional control statements are possible when a software process is represented by a reduced flow chart. An exception to this general rule is an exit from a loop. Such an exit may be made forward.

Definition G2: The negative state of a logic condition is the state of a logic condition which, when evaluated results in its 0-solution or low potential solution. With reference to FIG. 5(A), logic condition 1 is represented as L1 at k,b coordinate 2,1. Traversing the SUM-Graph shown in FIG. 5(A) through L1 with L1 in its negative state would result in relocating to k,b position 3,1 which is represented by SUM-Object set member /7 in the graph.

Definition G3: The positive state of a logic condition is the state of a logic condition which, when evaluated results in its 1-solution or high potential solution. With reference to FIG. 5(A), traversing the SUM-Graph shown in FIG. 5(A) through L1 with L1 in its positive state would result in relocating to k,b position 3,7 which is represented by SUM-Object set member E1 in the graph.

Definition G4: The binary address (BA) of an SUM-Graph element shows that elements position relative to process logic constructs and is represented by the integers 1 and 0 where the integers comprising the BA represent the solutions of the logic conditions in the t-pass up to that element with the process entry assigned the binary address of 1.

The binary address of those elements within the same segment are the same. The binary address of a 0-segment of a logic condition is generated by shifting the address to the left by one bit position and placing 0 at the rightmost position of the binary address. The binary address of a 1-segment of a logic condition is generated by shifting the address to the left by one bit position and placing a 1 at the rightmost position of the binary address.

Referring once again to FIG. 5(A), the binary address of k,b position 8,1 (L3) is 100. This is constructed from the process address (binary address 1), the negative solution (0) to the logic condition L1 located at k,b position 2,1 and a negative solution to logic condition L2 located at k,b position 6,1 in the graph. As a further example the binary address of A7 (located at k,b position 7,5 in FIG. 5(A)) is 101. This is constructed from the process address (binary address 1), the negative solution (0) to the logic condition L1 located at k,b position 2,1 in the graph and the positive solution (1) to the logic condition L2 located at k,b position 6,1 in the graph.

Construction of the SUM-Graph

The SUM-Graph 262 which is representative of target process 250 is built by the same next lowest potential rule previously described. The SUM-Graph 262 may be built from a previously constructed SUM-Frame 261 or built directly from analyzing the target process 250.

Figure 26:
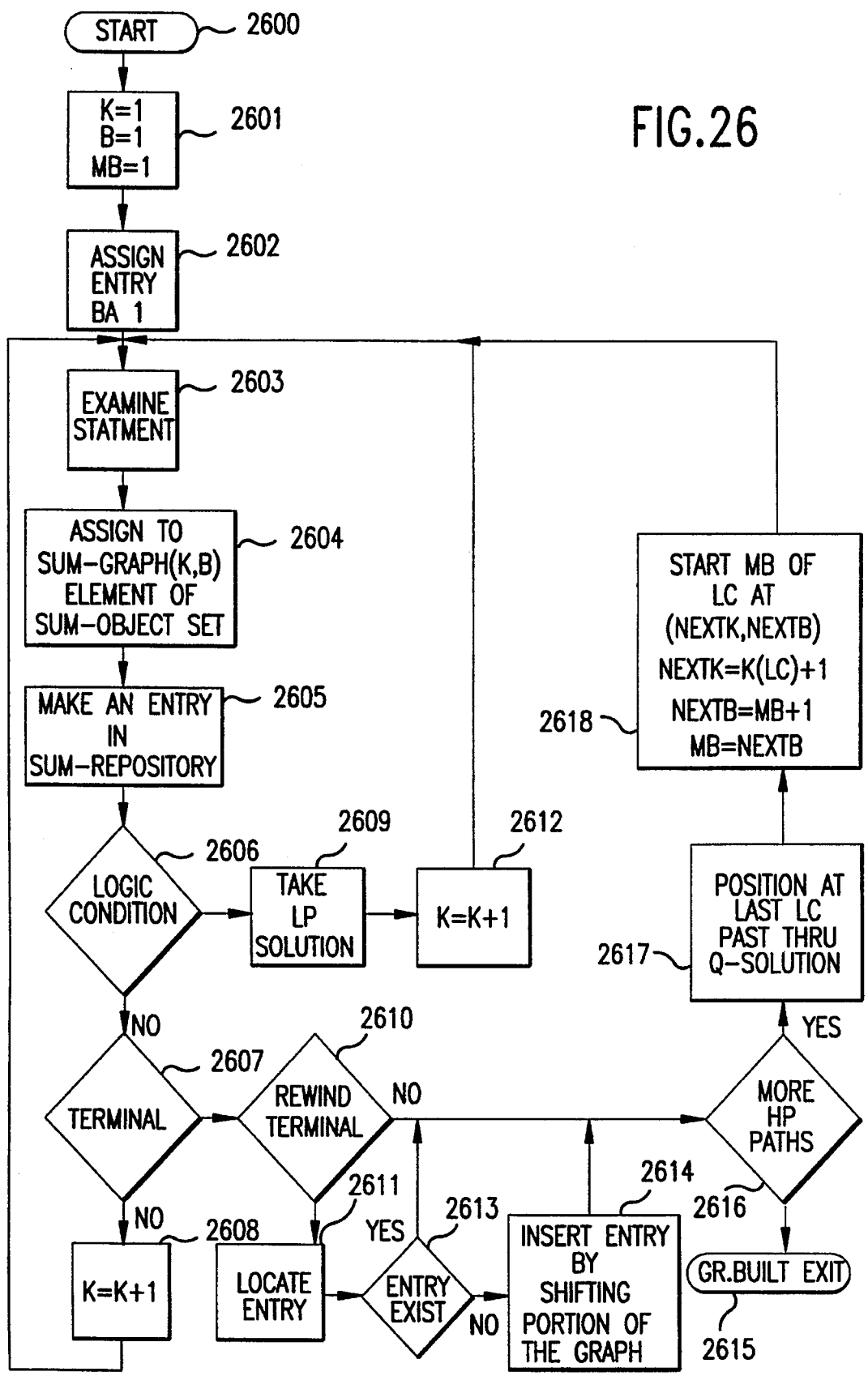
FIG. 26 is a flow chart depicting the steps necessary to create an SUM-Graph of a target process by the next lowest potential method or rule.

FIG. 26 is a flow chart depicting the steps associated with the analysis of a software process by the next lowest potential rule and the construction of the resulting SUM-Graph. The analyzer proceeds by beginning its analysis at start block 2600. The position on the graph is assigned to k,b position of 1,1 2601, and the entry binary address is assigned to 1 as indicated in block 2602. Successive statements of the process are examined by block 2603 with the SUM-Graph(k,b) position being populated with the SUM-Object set member representative of the examined statement as required by block 2604. The repository is updated in block 2605 and if the statement under examination presently is a logic condition 2606, then the low potential solution to the logic condition is taken 2609, the present k,b position is updated by k=k+1 as stated in block 2612 and the statement reexamination block 2603 is reentered.

If upon examination by block 2606 it is determined that the statement is not a logic condition, then the statement is tested in block 2607 to see if it is a terminal. If the statement so tested is not a terminal statement then the present k,b position is updated by k=k+1 (block 2608) and the statement reexamination is reentered.

If the statement examined by block 2606 is not a ihogic condition and it is a terminal (block 2607) then if it ks a rewind terminal other than a loop terminal the rewind entry is located. If it does not exits, it is inserted in tube SUM-Graph. A determination is made at block 2616 as to whether any further untraversed high potential paths exist (i.e., a logic condition for which a main branch is not yet built). If there are no remaining untraversed high potential paths in the target process under examination, then the graph is built and the SUM-Builder terminates 2615.

If there were untraversed high potential paths as determined by block 2616, then the SUM-Graph position is updated to the last logic condition passed through its 0 solution (block 2617) and a new main branch of that logic condition is begun at SUM-Graph position(nextk, nextb) where nextk is assigned to k(logic condition)+1 and next b is assigned to the last used b+1. The last used b is updated and the process then continues with the examination statement 2603.

The complementary to the Next Lowest Potential method (i.e., the Next Highest Potential method) that was mentioned earlier means the following: within the Next Highest Potential method, main branches would start not from the positive solutions of logic conditions, but from the negative solutions of logic conditions, and the main branches would pass not through the negative solutions of the logic conditions, but through the positive solutions of logic conditions.

FIG. 5(A) shows an SUM-Graph constructed by the SUM-Builder 259 using the above stated method of the present invention. Once the target process 250 is represented as SUM-Graph 262 as constructed by the SUM-Builder 259, a number of useful characteristics of SUM-Graph 262 as shown in FIG. 5(A) emerge.

By examination of the SUM-Graph shown in FIG. 5(A) is should be apparent that every element represented within the SUM-Graph may be addressed by a unique coordinate pair (k,b). For example, logic condition L1 is located at k,b position 2,1 in the graph. Logic condition L6 is located at k,b position 8,5 in the graph. Table 3 shows the elements, their corresponding and unique k,b coordinates and their resultant binary addresses which are created during the analysis of target process 250

In the present preferred embodiment, the SUM-Graph is built in only two directions—down and to the right as one looks at the graph. When the SUM-Graph so constructed is traversed, the traversal proceeds down the graph and can only be interrupted by shifting to the right as a result of a high potential solution to an encountered logic condition.

Referring once again to FIG. 5(A) the graph traversal would begin at k,b position 1,1 (process entry) and proceed through logic condition L1 (k,b position 2,1), through label /7 (k,b position 3,1), through arithmetic A1 k,b position 4,1) and so on until terminal *1 (k,b position 10,1) is reached. Such a traversal would proceed in a single direction, down the graph. If however, a high potential solution to a logic condition was passed through during traversal then a shift to the right would have taken place. For example, during the above traversal, if the logic condition L1 (k,b position 2,1) were passed through its high potential solution then a shift in flow would take place to E1 (k,b position 3,7).

Figure 5B:
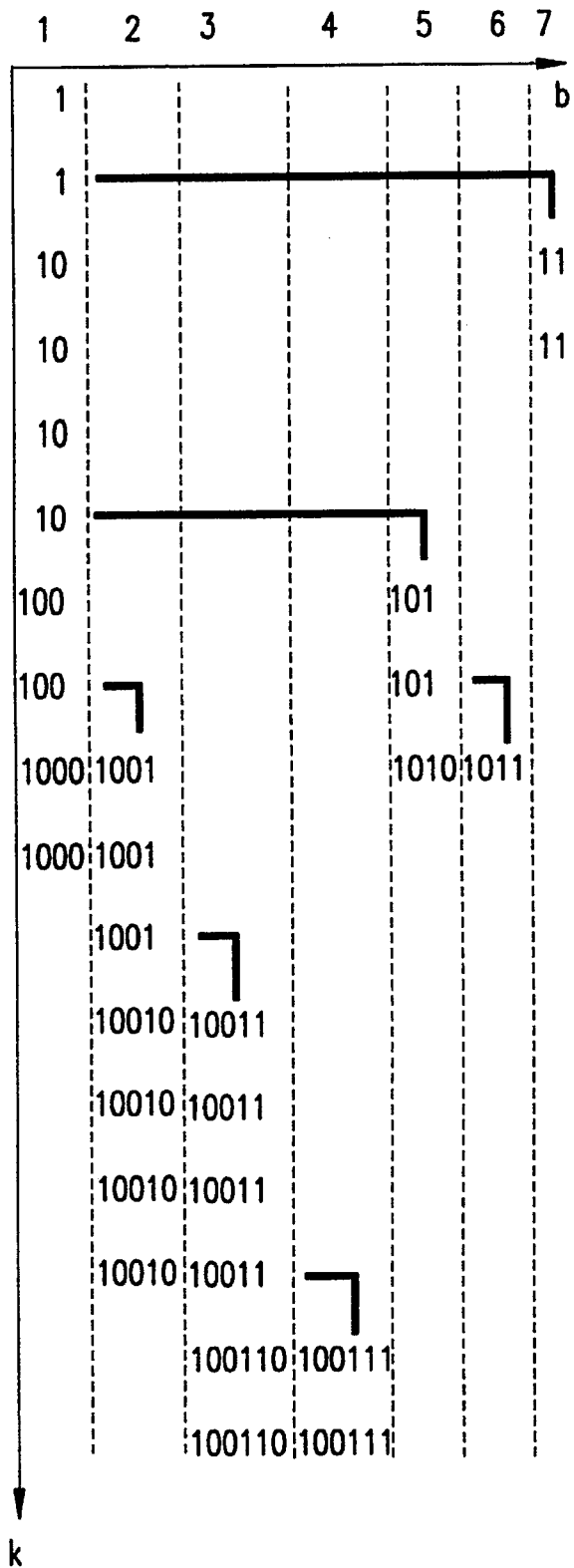
Figure 6:
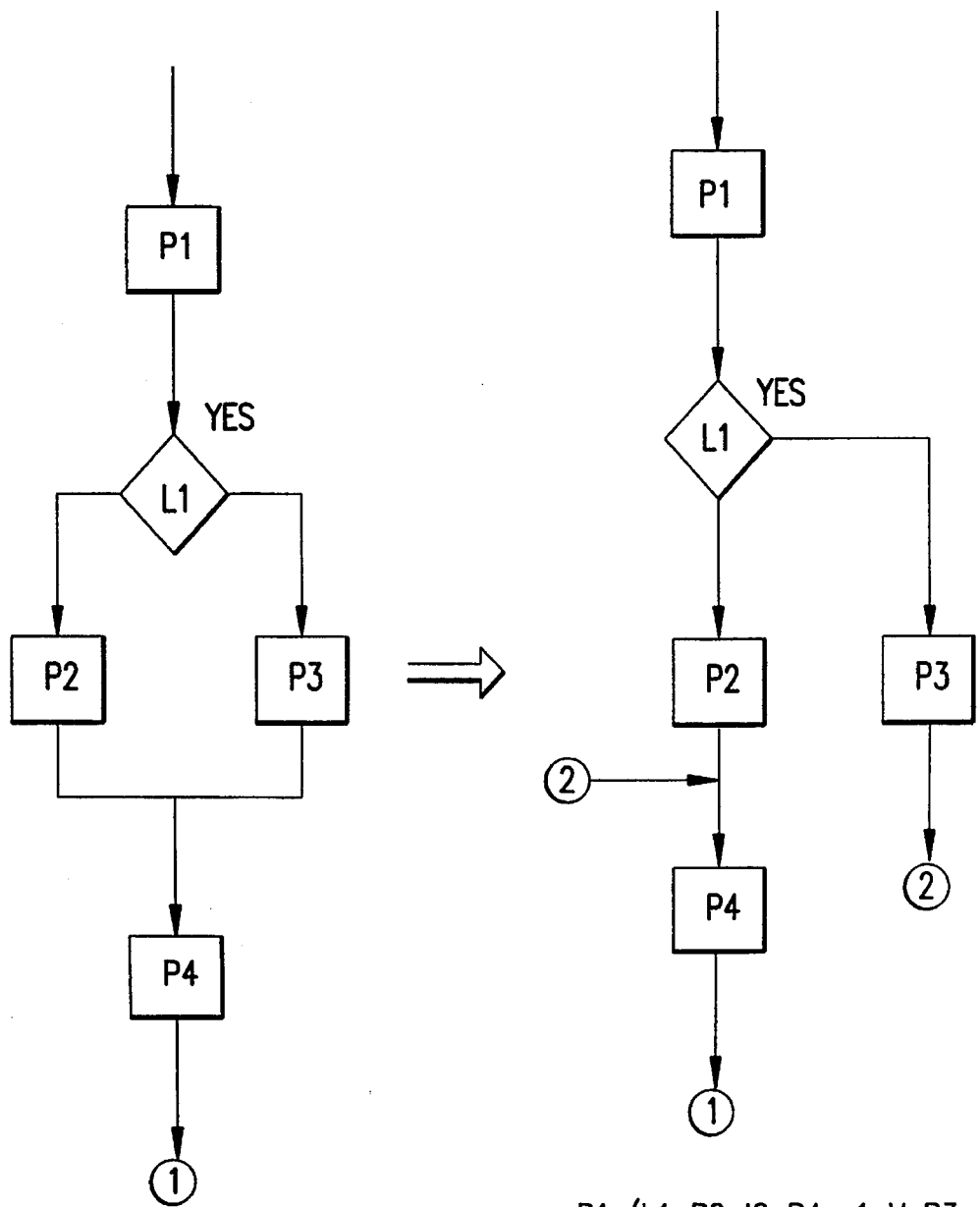
FIG. 6 shows how typical IF-THEN-ELSE program constructs are represented in SUM-Frame and SUM-Graph form(s).
Figure 7:
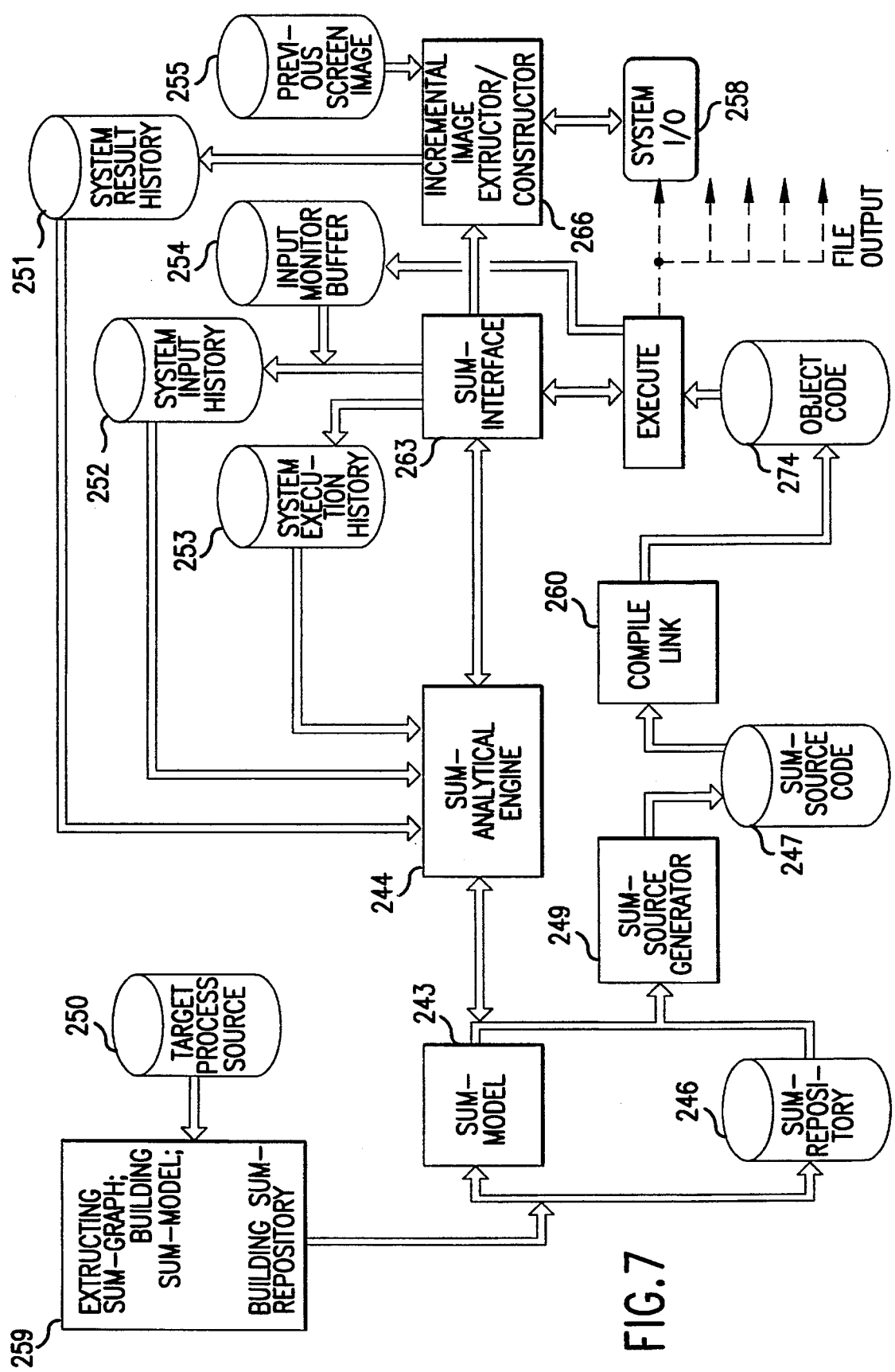
FIG. 7 shows the steps required to construct the SUM-Model, SUM-Repository and SUM-Source, and also shows the main components of SUM.

Further, every segment is assigned a binary address that uniquely identifies the logic position of that segment within the target process 250. FIG. 5(B) shows the binary addresses which are assigned to the elements which are contained within SUM-Graph depicted in FIG. 5(A). For example, logic condition L1 (k,b position 2,1) is assigned to binary address 1, logic condition L2 (k,b position 6,1) is assigned binary address 10, output statement W1 (k,b position 16,4) is assigned binary address 100111. Table 3 shows the binary address which correspond to the elements which comprise target process 250.

TABLE 3

| SUM-Object Set Member Address | (k,b) Position | Binary |
| --- | --- | --- |
| [ | 1,1 | 1 |
| L1 | 2,1 | 1 |
| /7 | 3,1 | 10 |
| A1 | 4,1 | 10 |
| /1 | 5,1 | 10 |
| L2 | 6,1 | 10 |
| A2 | 7,1 | 100 |
| L3 | 8,1 | 100 |
| X1 | 9,1 | 1000 |
| *1 | 10,1 | 1000 |
| A3 | 9,2 | 1001 |
| /2 | 10,2 | 1001 |
| L4 | 11,2 | 1001 |
| A4 | 12,2 | 10010 |
| /3 | 13,2 | 10010 |
| X2 | 14,2 | 10010 |
| *2 | 15,2 | 10010 |
| /4 | 12,3 | 10011 |
| A5 | 13,3 | 10011 |
| /6 | 14,3 | 10011 |
| L5 | 15,3 | 10011 |
| A6 | 16,3 | 100110 |
| *3 | 17,3 | 100110 |
| W1 | 16,4 | 100111 |
| *4 | 17,4 | 100111 |
| A7 | 7,5 | 101 |
| L6 | 8,5 | 101 |
| R1 | 9,5 | 1010 |
| *6 | 9,6 | 1011 |
| E1 | 3,7 | 11 |
| *7 | 4,7 | 11 |

Lastly, once SUM-Graph 262 construction is completed by SUM-Builder 259, the accessibility between two elements of target process 250 may be effectively determined. Accessibility between two elements s1, and s2, is defined as the presence of a path from s1 to s2. That is, s2 is accessible from s1 if there is some possible input data combination that results in s2 being executed some time after the execution of s1. Accessibility between two process elements is required if one element is capable of effecting the result of the second element.

Referring once again to FIG. 5(A), it becomes obvious that statement A7 (k,b position 7,5) is not accessible from statement W1 (k,b position 16,4). That is because there is no possible path from statement W1 that would proceed through statement A7. Statement A7 is however, accessible from statement X1 (k,b position 9,1). That is because statement *1 (k,b position 10,1) repositions the path taken to /1 (k,b position 5,1) which immediately precedes statement L2 (k,b position 6,1). The high potential solution of L2 leads directly to statement A7. Therefore, the analyzer which is the object of the present invention is able to determine whether statement(s) or elements of target process 250 could be influenced by the correctness of a particular statement or statements within that process. When the target process 250 is represented in SUM-Graph form as shown in FIG. 5(A) and is used subsequently for the construction of SUM-Model 243, the analyzer is capable of evaluating the possibility for a statement s1 of target process 250 to be responsible for the misbehavior of statement s2 of target process 250 by defining accessibility between s1 and s2 necessary condition for cause-effect relationship. Alternatively, the analyzer is capable of evaluating the potential for statement s2 to be effected by the modification of statement s1.

The accessibility between statements that comprise the SUM-Graph may be defined with respect to three potentials: 1) the free fall potential within a main branch; 2) the shift potential of a logic condition; and 3) the rewind potential of a terminal.

Free fall potential is determined by one process element becoming active after another unless the direction of execution is changed by a logic condition in a high potential state. Quite simply and with reference to FIG. 5(A), a free fall potential exists between arithmetic statement A1 (k,b position 4,1) and arithmetic statement A2 (k,b position 7,1) because the arithmetic statement follows the logic condition if target process 250 fell through the logic condition L2 (k,b position 6,1) in its low potential state until terminal *1 (k,b position 10,1) is reached.

The shift potential is the potential of a logic condition to increment the SUM-Graph b coordinate as a result of a positive solution of the logic condition. With reference to FIG. 5(A), logic conditions L3 (k,b position 8,1), L4 (k,b position 11,2), L5 (k,b position 15,3) and L6 (k,b position 8,5) all have a shift potential of 1 because a positive solution to any of them results in a right shift by one of the b coordinate. Similarly, logic condition L2 (k,b position 6,1) has a shift potential of 4 and logic condition L1 (k,b position 2,1) has a shift potential of 6.

In order to appreciate the significance of the SUM-Graph structure and the information which the analyzer derives from its inventive structure, some additional definitions are required to facilitate understanding.

Definition G6: *bn will refer to the terminal with b-coordinate equal n. With reference to FIG. 9 *b3 refers to the GO TO terminal on the b=3 and *b5 refers to terminal on b=5.

Definition G7: Mbn will refer to a Main Branch built on the b-coordinate equal n. By way of example and with reference to FIG. 9, MB3 refers to the Main Branch built on coordinate b=3.

Definition G8: The shift potential of LC is the potential of LC to increment b-coordinate as a result of a positive solution of the LC.

Definition G9: The rewind potential of a terminal is the potential of that terminal to change the next active Segment Address (SA).

Definition G10: The segment address (SA) is defined as a pair (BA,k), where BA is the binary address of the segment and k is a k coordinate within the segment. For example with reference to FIG. 5(A), the segment address of SUM-Object set member /3 is 10010,13 Further, segment addresses can be compared by the analyzer in a manner similar to the comparison of binary addresses.

To compare binary addresses, the analyzer left justifies the binary addresses, then corresponding bit position contents are compared from left to right in the binary addresses until a mismatch occurs. When comparing binary address bit position contents, 1>0> empty. By examining FIG. 5(A), 5(B) and Table 3, the comparison of binary addresses becomes apparent. The binary address of logic condition L2 (k,b coordinate 6,1; binary address 10) is greater than the binary address of logic condition L1 (k,b coordinate 2,1; binary address 1). The binary address of E1 (k,b coordinate 3,7; binary address 11) is greater than the binary address of L2 (binary address 10).

To compare segment addresses, the binary address component of the segment address is given greater priority, i.e., a segment address of 11,7 is greater than a segment address of 10,10 and segment address 11,7 is greater than a segment address of 11,6.

Definition G11: The vision of an element is the set of all elements which lie within any t-pass which passes through that element. An element s2 is within the vision of element s1 (or element s2 is seen from element s1) if the segment address (SA) of s2 is a descendant of the SA of s1. A statement s2 is within the vision of statement s1 if there is a path from s1 to s2 that is part of a t-pass.

Definition G12: A segment address of a statement is a descendant of the segment address of another statement if the binary address of the second statement is built from the binary address of the first statement by concatenating binary digits at the right, or if the BA(s1) is equal to the BA(s2) and the k coordinate of s2 is greater than the k coordinate of s1.

With reference to FIG. 4, A6 424 is within the vision of A3 412 since the segment address of 424 (100110) is a descendant of the segment address of 412 (1001). By way of an additional example, the binary address 1001 can be mapped onto 10011, therefore any element within segment 10011 is within the vision of an element within segment 1001. Further, element X2 417 (binary address 10010) lies within the vision of element A4 415 (binary address 10010) since they have the same binary address and the k coordinate of X2 (14) is greater than the k coordinate of A4 (12) when mapped to the SUM-Graph.

Definition G13: The vision of a rewind terminal is defined by the vision of its rewind entry. The vision of the exit terminal is empty. As an example, refer to FIG. 9. The vision of rewind terminal 1 930 is the vision of its rewind entry 912. The vision of exit terminal 960 is empty.

Definition G15: The access field of a process element is the combination of all the visions that the element successively owns. When an element sees a terminal, a vision of that terminal, which is the vision of its rewind entry may see some terminals which were not originally seen. And so on . . . therefore expanding the access field of the examined process element.

Definition G16: The rewind binary address (RBA) is the binary address of the rewind terminal entry. The rewind binary address of the exit terminal is 0. Referring to FIG. 5(A), the RBA of terminal *1 (k,b coordinate 10,1) is defined by its terminal entry /1 (k,b coordinate 5,1) Therefore the RBA of terminal *1 is the binary address of /1, which is 10. The position of rewind terminal entry is identified by a pair {BA,rk}, where rk is the k coordinate value of the rewind terminal entry. The rk value of the exit terminal is zero.

Definition G19: An open terminal is an exit terminal or rewind terminal that has access to an exit terminal.

Definition G18: A closed terminal is a rewind terminal that does not have access to an exit terminal.

Definition G17: The exit access indicator (EAI) is an indicator which is set to 0 for closed terminals and set to 1 for open terminals.

Definition G20: A closed region is a combination of adjacent main branches which are identified by closed terminals. Once a target process 250 enters a close region, that process cannot terminate. Referring to FIG. 9, terminals 944, 952 and 950 identify a closed region.

Definition G21: The propagated vision point (PVP) of a process terminal is defined by the vision of all the terminals that the process terminal sees. As previously defined, the vision of a terminal is the vision of its rewind entry. If the rewind entry of a first process terminal can see a second terminal whose rewind entry can see the rewind entry of the first process terminal, then the vision of the second rewind entry becomes the propagated vision point for both the first and second terminal.

Figure 10B:
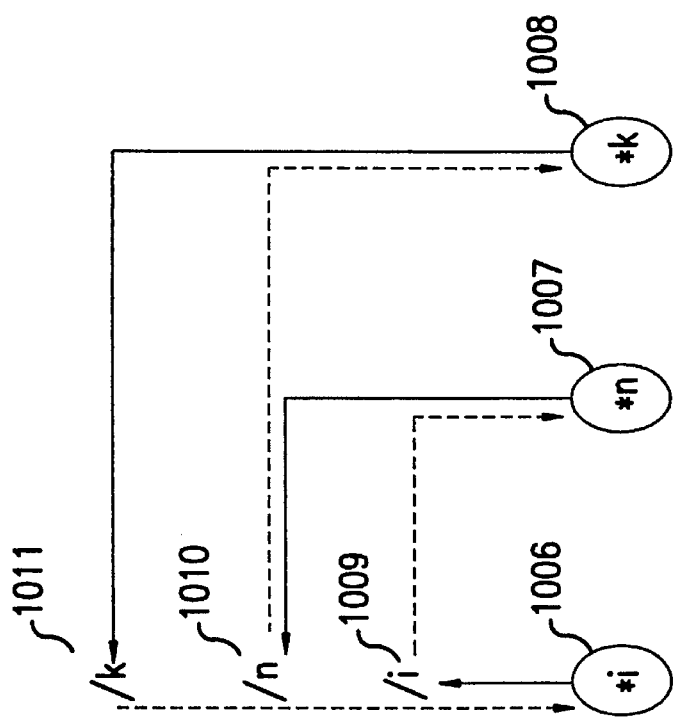
FIG. 10 shows the construction of the Propagated Vision Point of a process terminal.
Figure 10A:
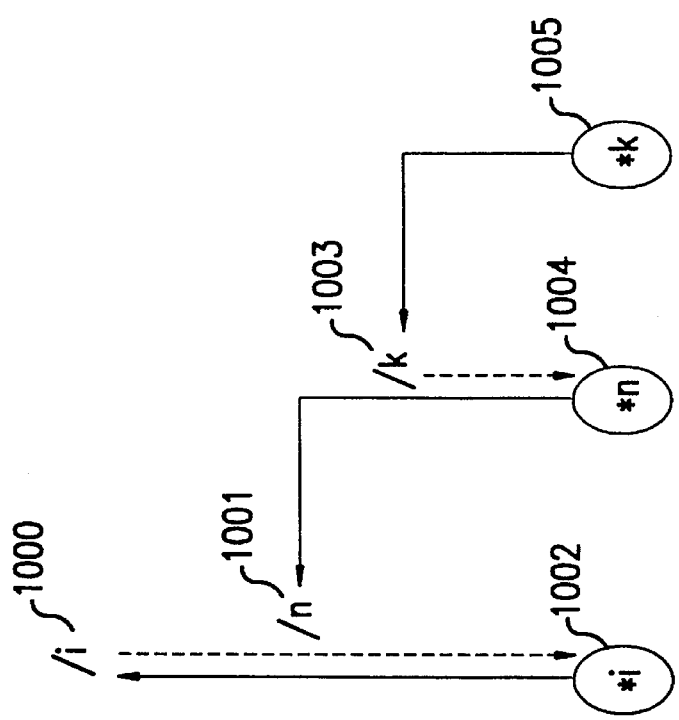
Figure 12:
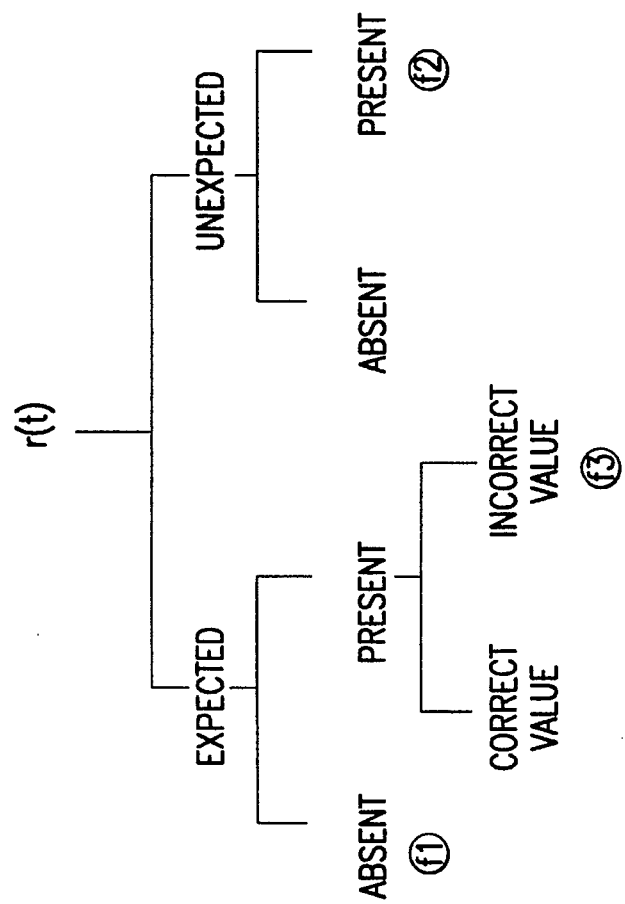
FIG. 12 shows three different types of target process failure(s).
Figure 11:
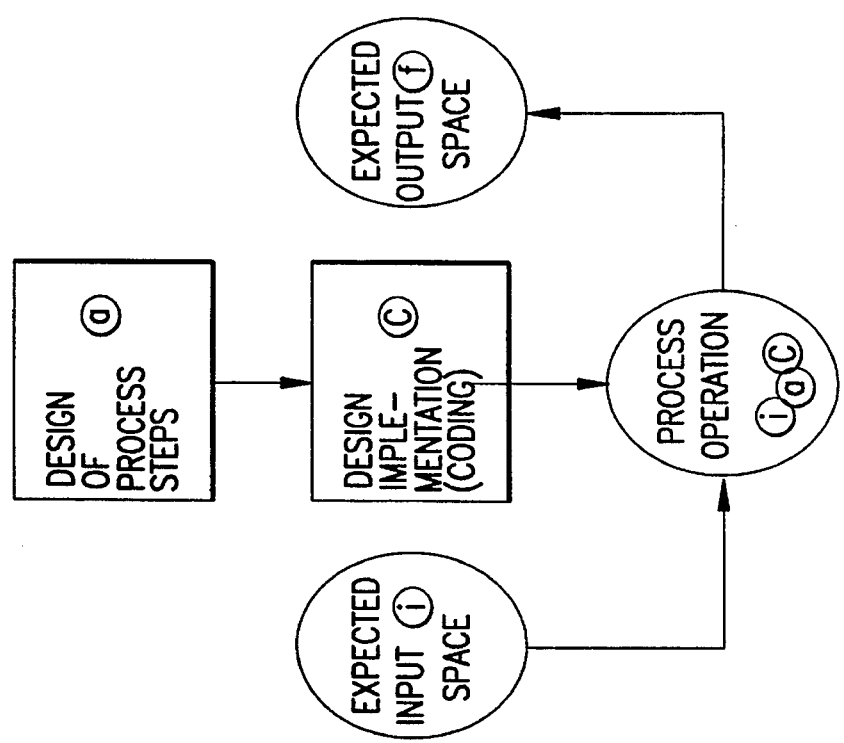
FIG. 11 shows a target process with faults and their potential origin.
Figure 13:
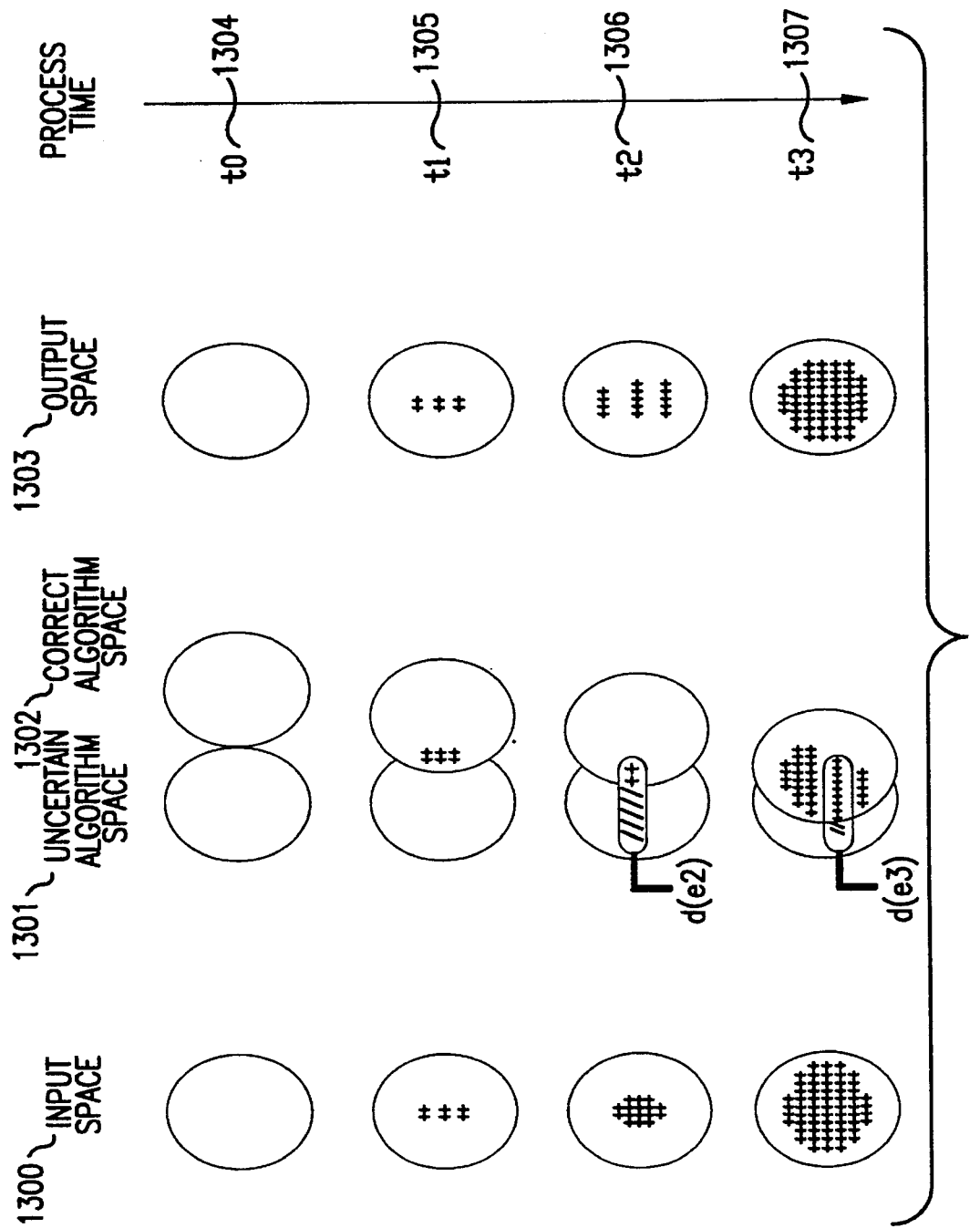
FIG. 13 shows how the Software Understanding Machine (SUM) minimizes the area of uncertainty within a target process, which area is defined as an area that could contain a fault.

By way of example and with reference to FIG. 10, if rewind entry /n 1001 of process terminal *n 1004 can see another terminal *i 1002 whose rewind entry /i 1000 can see the rewind entry /n 1001, then the vision of *n 1004 is propagated by the vision of *i 1002 and the vision of *i 1002 becomes the propagated vision point of both terminals *i 1002 and *n 1004. Therefore the propagated vision point of terminals *i 1002 and *n 1004, is the rewind entry of /i 1000.

Further, the terminal *k 1005 has a rewind entry /k 1003 which sees another terminal *n 1004. The vision of *k 1005 is therefore propagated by the vision of *n 1004 that have been already established as being propagated to /i 1000. The propagated vision point of terminal *k 1005 therefore becomes /i 1000.

The propagated vision point of a terminal is represented as a segment address of a specific rewind entry. If a terminal vision is not propagated by the visions of other terminals, then the propagated vision point of that terminal is its own vision, i.e., the vision of its rewind entry.

When all of the terminals within the vision of a rewind entry have that entry as their propagated vision point, the result is a closed region (Data Independent Endless Loop). This is because none of the terminals within the vision of the rewind entry have access to an exit terminal since the propagated vision point of an exit terminal is zero.

Once the SUM-Graph 262 is constructed, the exit access indicator (EAI) table is constructed. FIG. 9 shows a sample EAI table constructed from the terminal binary address, the rewind binary address and rk of each process terminal, all of which are known once the SUM-Graph is constructed.

FIG. 9 shows an EAI table which is constructed according to the following method. First, the original value of the propagated vision point of a terminal is built from that terminal rewind entry, that is, the rk and RBA of the terminal. Second, the EAI of all rewind terminals are set to 0 (set closed) and the EAI of all exit terminals are set to 1 (set open). Lastly, and proceeding from b=1 to the maximum b of the SUM-Graph, each terminal PVP is compared with the Binary Address and PVP of every other terminal in an attempt to propagate (decrement) the PVP of the current terminal under examination and attempt to open that terminal if closed. If the PVP of a closed terminal can see any open terminal, then the examined terminal is defined as open by setting its EAI to 1.

By way of further explanation and with reference to the EAI table shown in FIG. 9, the construction of the EAI table proceeds as follows:

1) Set the PVP of terminals to the segment address of their rewind entries:

BA of PVP of terminal *b1 (PVP*b1) is set to 10;

BA of PVP*b2 is set to 1001;

BA of PVP*b3 is set to 10010;

BA of PVP*b4 is set to 10011;

BA of PVP*b5 is set to 0, since *b5 is an exit terminal;

BA of PVP*b6 is set to 10011;

BA of PVP*b7 is set to 10; 2) Propagate the PVP and Set the EAI. If the PVP of a closed terminal can see any open terminal, then the examined terminal is defined as open by setting its EAI to 1.

a) PVP*b1 {10,rk1} sees *b2,*b3,*b4,*b5, but neither of those terminals PVPs can see PVP*b1. Therefore
PVP*b1 is not changed;

PVP*b1 {10,rk1} sees open *b5 (1010);
open *b1: set EAI*b1 to 1.
b) PVP*b2 {1001,rk2} sees *b3,*b4 whose binary addresses are 100110 and 100111, but neither of these terminals can see the PVP*b2. Therefore,
PVP of *b2 is not changed;
PVP*b2 {1001,rk2} does not see any open terminals;
EAI*b2 is kept 0;
c) PVP*b3 {10010,rk3} sees *b2 (10010) and PVP*b2 {1001,rk2} sees PVP*b3, that is, {10010, rk3}.
Therefore,
set PVP*b3 to PVP*b2: {1001,rk2};
propagated PVP*b3 still does not see any opened terminals;
EAI*b3 is kept 0;
d) PVP*b4 {10011,rk4} sees *b3 (100110), and PVP*b3 {1001,rk2} can see PVP*b4 {10011,rk4};
set PVP*b4 to {1001,rk2};
propagated PVP*b4 still does not see any open terminals;
EAI*b4 is kept 0;
e) PVP*b5 is not changed, since it is an exit terminal;
f) PVP*b6 {10011,rk6} sees *b3 and *b4, whose current PVPs {1001,rk2} can see PVP*b6;
set PVP*b6 to {1001,rk2};
propagated PVP*b6 still does not see any open terminals;
EAI*b6 is kept 0;
g) PVP*b7 {10,rk7} can see terminals from *b1 to *b6, but neither of them can see PVP*b7;
PVP*b7 is not changed;
PVP*b7 {10,rk7} can see open terminals (1000 and 1010);
open *b7: set EAI*b7 to 1;

In some target processes and with reference to FIG. 10(B), terminal *i 1006, that is propagated by the vision of *n 1007, is examined before the PVP of *n 1007 is finally set, since the PVP of *n 1007 may in turn be upgraded by the vision of the other terminals. Therefore, the only way to make sure, that all the possible upgrades of PVP and EAI were performed, is to repeat the step (2) of examining all the terminals in the order from *b1 to *bn once again. If no upgrades were done within the last pass, the process of upgrading the PVPs and EAIs is finished.

In the worst case, the number of required passes through the terminals, i.e. executions of step (2) is equal to the number of Main Branches, NB, since each pass will finally set the PVP and the EAI of at least one terminal. In the above example all upgrades were performed in one pass, and the second pass through *b1 to *b7 will not change any PVP or EAI.

Once the exit access indicator table is constructed, Propagated Vision Points built into this table allow one to define the accessibility between any two elements of the graph. As a consequence, all data independent endless loop constructs are located, as those constructs do not have accessibility to an exit terminal.

It is commonly accepted that the question of whether or not a program will terminate is proven to be unsolvable. We can divide this question of process "terminability", i.e. ability to terminate, into two categories: 1) data independent endless loops and 2) data dependent endless loops.

A data independent endless loop consists of process elements that do not have an access to "exit[ terminals. A data dependent endless loop is such a construction that after entering it the control will never reach an exit (STOP or RETURN) by the reason other than the absence of control passes to these exit terminals. The reason in this case is either: a) the absence of the manipulation of program variables, that could potentially change the control pass on the specific control passes, or b) change of these program variables in the direction that takes the values of LCs further from changing their states between Low Potential State and High Potential State.

In both cases a and b above, the control will fall into an endless loop, going through the same terminals in the same sequence, without ever being able to reach an "exit" terminal.

As an example of data dependent endless loop and with reference to FIG. 9, if there are no elements on the pass between /1 912 and *1 930 that can redefine the values, being examined by L2 914 and L3 924, then terminal *b1 930 will produce a data dependent endless loop as soon as L2 914 and L3 924 will be resolved by their Low Potential solutions the first time (since the state of L2 914 and L3 924 will never change during the forward execution of the target process.)

As an example of a data independent endless loop and with reference to FIG. 9, a data independent endless loop construction is presented by Main Branches MB2, MB3, MB4. If L3 924 is ever solved positively, the process will go in the infinite loop, no matter, what data manipulation statements are coded within those branches.

While data dependent endless loops constructs present a potential for process "non-terminability", they are not necessarily faulty constructions, since it could be so, that an input data can never be such, that would set LCs in the state of infinite loop.

Entry /q 922 in FIG. 9 does not correspond to any terminal and is shown only as an example of the fact, that the position of L3 924 in the negative subfield of L2 914 with rewind terminal *b1 rewinding the process control directly in front of L2 914 is not necessarily a fault, even if L2 914 and L3 924 are not data dependent on the path /1 to *1 930. This is, because, if L3 924 had received control through the entry /q 922, returning the control to the entry /i 912 will not necessarily result in L2 914 being solved negatively thus in creating an endless loop. Data Independent Endless Loops are definite faults in the process construction.

The detection of data independent endless loops is done by evaluating an accessibility between rewind terminals and exit terminals. The same process would allow evaluation of accessibility between any two elements of SUM-Graph (for example between A2 and A7 in FIG. 9).

As a result we see: EAIs of terminals *b2, *b3, *b4 and *b6 are 0, these terminals are closed. Terminals *b2,*b3,*b4 constitute a closed region (data independent endless loop). Terminal *b6 is also closed and its rewind entry is within the mentioned closed region [*b2–*b4]. Dotted line 966 represents the vision field of an entry /1 { 10,rk1}. This entry is PVP of *b1. This means, that any element of Main Branch b=1 can access any element within the vision of {10,rk1}.

An access field of A2 is represented by the dotted line 966. Dotted line 967 represents the vision field of an entry /2 {1001,rk2}. This entry is PVP of *b2, *b3, *b4 and *b6. This means, that any element of Main Branch MB2, MB3, MB4 and MB6 can access any element within the vision of {1001,rk2}.

By definition, an access field of a process element is the combination of all the visions it successively owns. Therefore, an access field of A7 is combined by the fields represented by dotted line 964 and dotted line 967, as dotted line 964 is the vision of A7 and dotted line 967 is the vision of *b6 that is seen from A7.

From FIG. 9 we can see, that A2 can access A7, and A7 cannot access A2.

As an example from FIG. 9, Examining the attributes (BA, RBA and PVP) that are built for every terminal, we can determine the following: a) A2 can not see A7, as 101 is not seen from 100. However, A2 can access A7, since one of the terminals, seen from A2, *b1, can see A7 through its PVP {10,rk1}, as 101 is a descendent of 10; b) A7 can not see A2, as 100 is not a descendent of 101; the terminals that are seen from A7 are ones with BAs 1010 and 1011; Terminal 1010 has no RBA or PVP, being an exit terminal; terminal 1011 has PVP {1001,rk2}, which can not see 100 either. Therefore A7 can not access A2.

Data dependent endless loops could be determined using our method of propagated vision points in the following manner. Once the sequence of terminals executed repeats many times it could become useful to locate the propagated vision point of those terminals and then to see whether or not there are any data manipulation statements on the t-passes from this PVP to those terminals which data manipulation statements affect the variables checked by the logic conditions located on the t-passes from this PVP to those terminals. If no such statements exist, we have a data dependent endless loop. If such statements exist but are constructed in a way such that the variables change in the direction that would take the value calculated by the logic condition further from the value that would change the status of the logic condition, we also have a data dependent endless loop.

Determining Process Correctness

As a result of the structures which are constructed by the SUM it is possible to evaluate the correctness of a target process. In order for those skilled in the art to readily appreciate how the SUM operates, the following definitions are necessary at this point.

Definition P1: The symbol (s), represents a process element or individual statement of a program.

Definition P2: The Process Address, (PA) {k,b} of an element is the position of the element within the reduced flow chart of the process or the position of the element within SUM-Graph of that process. With reference to FIG. 5, the PA of an element is defined by the k,b coordinate pair which describes the position of the element within the reduced flow chart. With reference to FIG. 5, element A2 has a PA of 7,1. Each statement that comprises a process has a unique PA.

Definition P3: The local time {p} parameter is an integer value which represents the present occurrence of a PA within a process execution. Local time is started with the initial invocation of the process. The local time can only be measured at a PA. The SUM does not utilize time as it is normally used, i.e., a measurement of duration. Instead, time as recorded by the SUM is a measurement of the number of occurrences of a particular statement. Therefore each event or occurrence of a statement execution is identified by its own time parameter.

Definition P4: A process event is an event of a process statement execution.. A process event is defined by {k,b,p}, where k,b are the coordinate pair which identify the process address and p is the local time within this process address.

Definition P5: The Process time is represented by process events {k,b,p}. As an example and with reference to FIG. 5(A), when statement A5 is executed the third time, that moment of execution is referred to as the {13,3,3} event.

Definition P6: A process event {k,b,p}, other than an output event, is correct if that event takes part in a chain of events which produce a correct output event. An output event is correct if it produces expected result. In other words, the output event is correct if the expected value is produced at the expected process time.

Definition P7: A Correct Process Address (CPA) contains a process element (s) that had been executed as a correct event, in other words, the event produced a correct result at a correct place and time Definition P8: An Uncertain Process Address (UPA) contains a process element (s) that has not yet been executed as a correct event.

A state of PA as UPA or CPA, is relative to some other time in the process. This state could be changed at some process time {ke,be,pe} which is an event of execution of some other process address {ke,be} which event could define (s) event execution as correct or could make it uncertain.

As an example, consider a process defined by the chain of events e1, e2, e3, e4, e5, e6 and e7 where e7 is a correct output event, e1 and e3 are input events and e1, e2, e3, e4 and e6 were involved in producing the correct output event e7. Therefore, events e1 through e7 except e5 are correct. Event e5 may be defined as correct by some other correct output event chain in which e5 took place, but until such a time its correctness is uncertain.

Definition P9: The algorithm space of a process is the space defined by the combination of all process addresses {ki, bi}. With reference to FIG. 5, the algorithm space of the target process described by the reduced flow chart is bounded by the maximum k and maximum b shown.

Definition P10: The correct algorithm space of a process is the space of all process addresses which are presently defined as correct process addresses.

Definition P11: The uncertain algorithm space of a process is the space of all process addresses which are presently defined as uncertain process addresses.

In both of the above definitions the correctness or uncertainty of a space is relative to the present time. This is due to the fact that the SUM has the ability to later redefine a correct event as uncertain (losing the knowledge). The process address becomes uncertain if it does not any longer have a history of being executed as a correct event.

Definition P12: The event definition space of an event (e) consists of process addresses of the event's ancestor events.

Definition P13: An ancestor event is a prior event which took part in producing a later event by either: 1) being a part of the chain of events producing a value of the later event (value ancestor event) or 2) being a part of the chain of events producing a value of a conditional control event in a path leading to the later event (control ancestor event). If either of these conditions are present, then the later event is a descendent of the prior event.

By way of example and with reference to FIG. 14, We(a) 1400 is a descendent of the events shown below We(a) and within its branches. Further, e(d) is a descendent of e(i) 1410, #*e(j) 1413, e(k) 1414, *e(l) 1415, *e(m) 1418 and the other events that are the ancestors of #*e(j) 1413, which are #e 1417, #e 1419, #e 1420, #e 1421.

The SUM operates by preserving the event definition space of correct events which, in turn, preserves the elementary knowledge of process that is the knowledge of the correct execution events of the process elements. The SUM continuously evaluates the event definition space of new output events and expands the correct algorithm space of a target process 250, when possible. On the other hand, when evaluating the event definition space of output events found to be incorrect, it may lose previously built knowledge of correct algorithm space by losing the status of some CPA to UPA.

The relationship between A,L,D,E,X,*,+,C,!,/,R,=,S and W elements of the SUM-Object Set are such, that an approved event of a W element execution activates a chain of secondary processes. These secondary processes thereby approve the execution events of those SUM-Graph elements that were involved in producing the approved event.

As a consequence of the principles we are using, the fault(s) responsible for the failure of an output result will be located within that part of the output result event definition space that lies within the area of uncertain algorithm space. Likewise, modifications made to a program as a result of new system requirements must be located within that part of the output result event definition space that lies within the area of uncertain algorithm space. If there is no uncertainty within the event definition space of the results that must be modified, then the new branches should be built in order to preserve correct algorithm space.

Definition K1: The approval of an event is the process of validating that events correctness by the SUM-Analytical Engine.

Definition K2: A control event is any event which may potentially change the direction of a process from falling down the main branch.

Definition K3: An unconditional control event is an execution of rewind or exit terminals as defined in the SUM-Object set by {*,+,C,R,=}.

Definition K4: A conditional control event is an execution of a logic condition.

A positive solution of a conditional control event results in a control shift of a process to the right as viewed within an SUM-Graph or reduced flow chart. A negative solution to a conditional control event results in the direction of a process to proceed downward as viewed within an SUM-Graph or reduced flow chart.

Definition K5: A data manipulation event is an execution of an (A) or (E) or the arithmetic part of a (D) element of the SUM-Object Set.

Definition K6: An initial data manipulation event" is one of the following: E-event, A-event of data initialization or D-event of the loop index initialization.

Definition K7: A Secondary Data Manipulation event is any data manipulation event other than an initial data manipulation event.

Definition K8: An elementary knowledge of a process element is obtained, when one of its execution events is approved. Accumulating knowledge about a process is performed by accumulating information about the correctness or uncertainty of the process element's execution events.

Definition K9: Elementary knowledge propagation is a process by which a elementary knowledge of an event is applied to different process addresses. Elementary knowledge propagation is performed by locating and analyzing all of the ancestor events up to a knowledge propagation terminal events.

Definition K10: A knowledge propagation terminal (KP terminal) is defined as an event that either has no ancestor within the target process (i.e., an initial data manipulation event) or is a previously approved event.

Terminating knowledge propagation at previously approved events stabilize the process of knowledge propagation and prevent the knowledge propagation process from becoming increasingly complex with the accumulation of ancestor events during the forward execution of a target process. When a knowledge propagation process encounters a previously approved event, all of the ancestor events of the approved event were previously approved as well.

Figure 14:
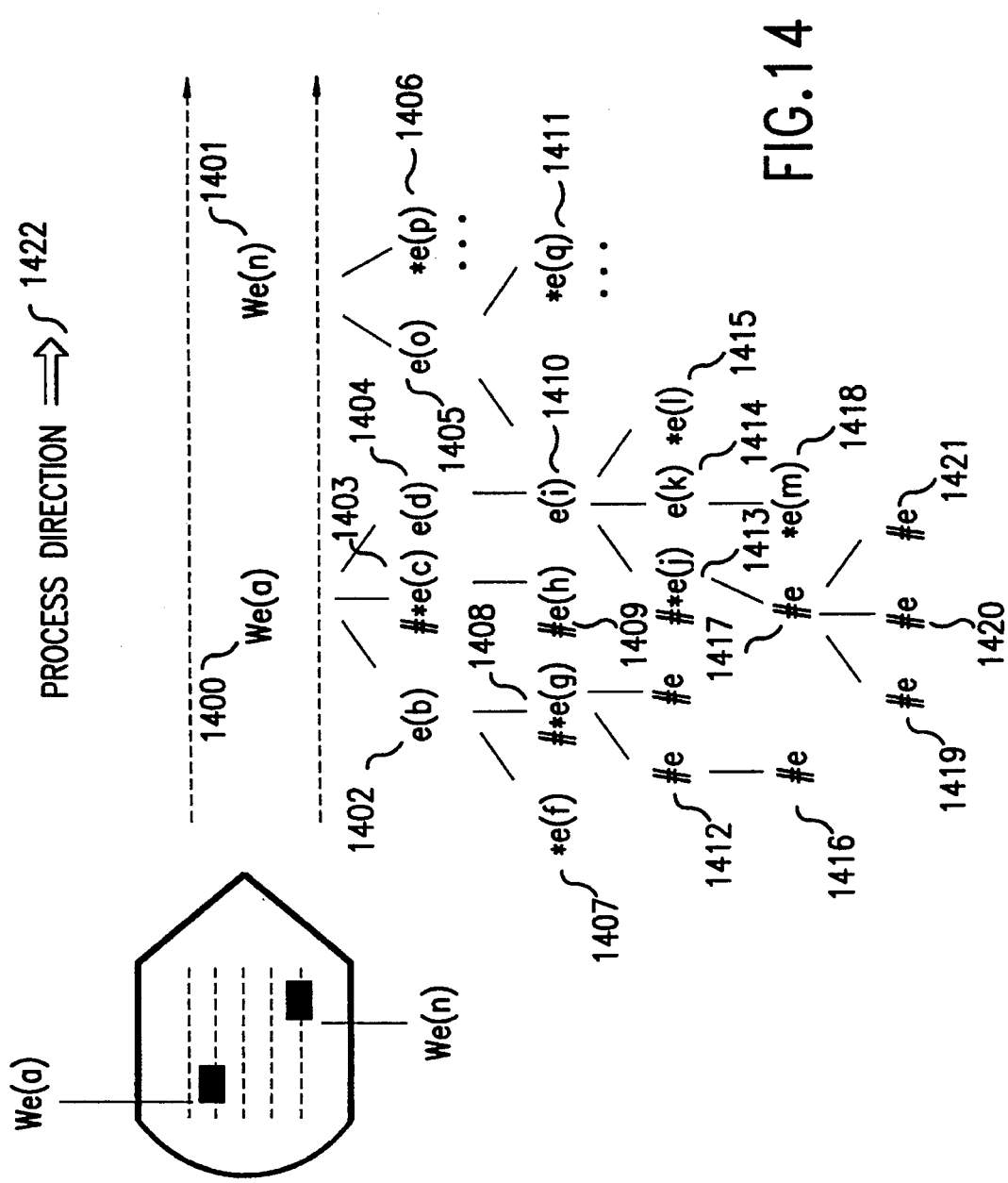
FIG. 14 shows the terminated event definition space.

FIG. 14 shows events We(a) 1400 and We(n) 1401 above a tree of their ancestors. The process direction is indicated within FIG. 14 by arrow 1422, therefore event We(a) 1400 occurs at some time before event We(n) 1401. In this example, *e represents a KP terminal event, that is an initial data manipulation event and #*e represents a KP terminal that is a previously approved event.

In FIG. 14, the value of We(a) 1400 was calculated from three parameters whose three values were produced by the three events e(b) 1402, #*e(c) 1403 and e(d) 1404, respectively. Further, a value associated with e(b) 1402 was calculated from two parameters whose two values were produced by the two events *e(f) 1407 and #*e(g) 1408 respectively. Event *e(f) 1407 does not have any ancestors, since it is an initial data manipulation event and is therefore a KP terminal. Event #*e(g) 1408 was previously approved (as indicated by #) and therefore it is also a KP terminal.

There is no attempt by the SUM to locate the ancestors of a KP terminal. This is because such ancestors either: 1) are not present (as is the case with *e(f) 1407) or 2) have been previously approved (#*e(g) 1408).

Figure 17:
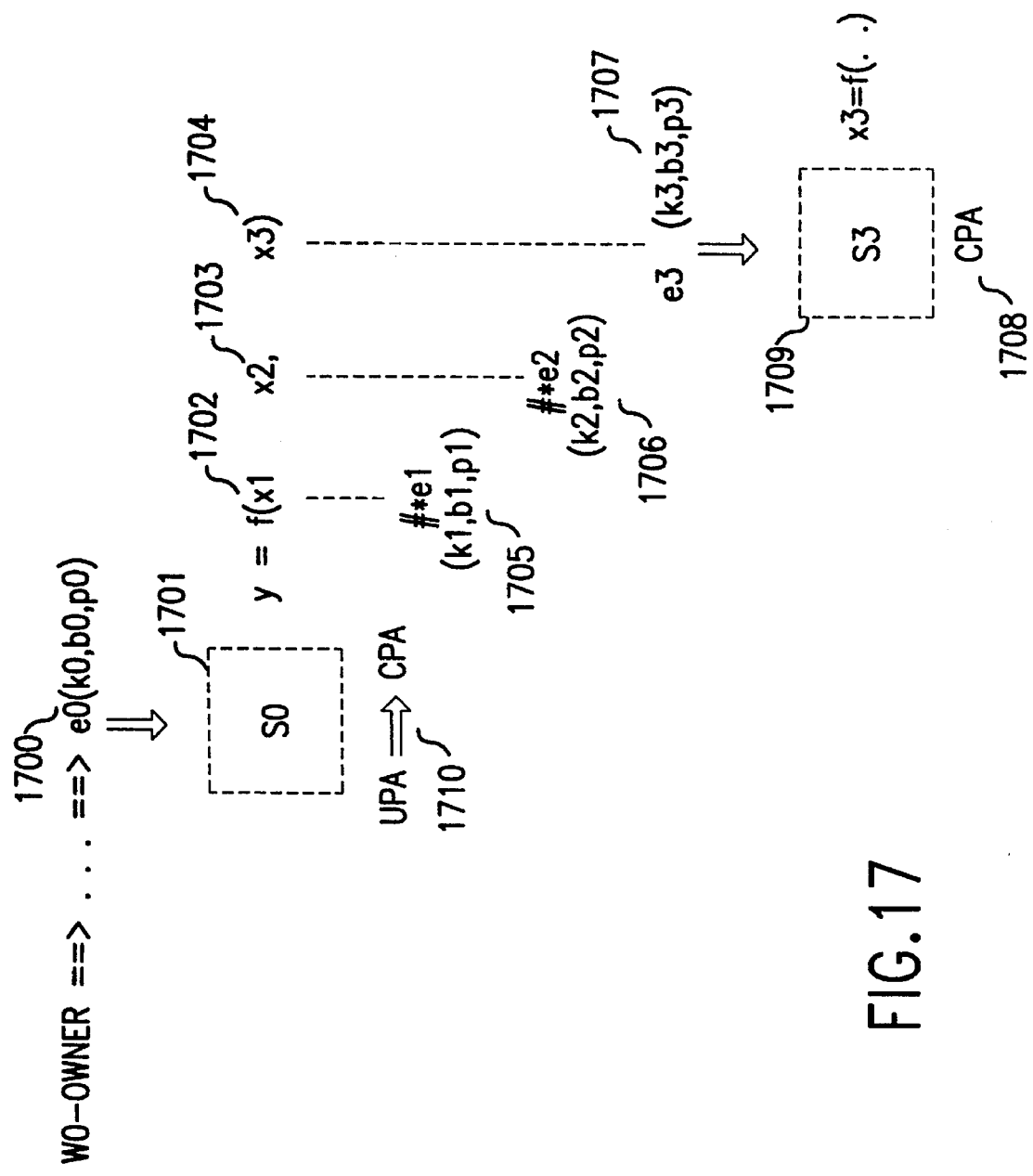
FIG. 17 shows the knowledge propagation process propagating only in specific directions and only up to the knowledge propagation terminals.

With reference to FIG. 17, event e(0) 1700 is shown as occurring at some process time (k0,b0,p0). Further, if event e(0) 1700 were the first approved event of s0 1701, then the PA of s0 1701 is upgraded from UPA to CPA as indicated by arrow 1710. This example shown in FIG. 17 indicates that a value of variable y is a function of three other parameters, x1 1702, x2 1703 and x3 1704.

The immediate ancestors of s0 1701 are the events which produced the value of the parameters involved in the s0 1701 calculation. The value of the parameters of s0 1701, namely x1 1702, x2 1703 and x3 1704 are determined by ancestor events #*e1 1705, #*e2 1706 and e3 1707. If events #*e1 1705 and #*e2 1706 were previously approved as shown, they are treated as KP terminals and we do not examine their ancestors.

Event e3 1707, which calculates parameter x3 1704 was not previously approved. The CPA status 1708 which was a state of the process address of statement s3 1709 during the process time (k0,b0,p0), means that some other event(s) of this PA execution was previously approved. Therefore, it is necessary to examine all of the ancestors of the event e3(k3,b3,p3) 1707 until a KP terminals are met in the examination in all directions.

Definition K11: The immediate owner of an event is another event which approved the event.

Definition K12: A W-owner of an event is a descendent of the event which originated the chain of elementary knowledge propagation that approved the event.

Each event has only one W-owner event and only one Immediate Owner event. In some situations, the W-owner of an event and the immediate owner of an event are one and the same.

As an example of event approval and with reference to FIG. 16, a process address (k,b) 1600 is shown during five different process times t1 1605, t2 1606, t3 1607, t4 1608 and t5 1609, respectively. These process times are defined by the execution of events at some addresses other than (k,b). At time t1 1605, the PA 1600 had no occurrences of its execution. At time t2 1606, there has been two occurrences of PA 1600, e1 1610 and e2 1611, neither of which has been approved. At time t3 1607, there has been three occurrences of PA 1600, e1 1610, #e2 1611 and e3 1612. Further, event #e2 1611 has been approved during the interval which occurred between t2 1606 and t3 1607. The status of Process address 1600 therefore, is known to be CPA at time t3 1607. The W-owner attribute of CPA helps to maintain the current knowledge of the target process 250. When a previously approved W-event is disapproved, the target process knowledge is dropped to the level determined by the position of the disapproved W-owner event in the target process time.

The process of approving an event generates a secondary process which approves the immediate ancestors of the event unless the immediate ancestors are already approved or do not exist. Therefore, the propagation of elementary knowledge of the process continues in the direction of all ancestors until a knowledge propagation terminal encountered in each direction.

Building the SUM-Model of the Target Process

After the SUM-Builder 259 finishes construction of the SUM-Graph previously described, an SUM-Model 243 of target process 250 is built. The invention constructs a different SUM-Model for each distinct software process analyzed where the process is procedure i.e., program, subroutine, function, paragraph. Although the preferred embodiment of SUM-Model 243 discussed in this detailed description is a three dimensional model, those skilled in the art could readily adapt the model of the present invention to additional dimensions. Two of the three dimensions on which the SUM-Model is constructed have already been described, namely the k,b coordinates of the SUM-Graph 262.

The third dimension of the constructed SUM-Model comprises a structure, that is populated with attributes of process addresses. The process address of an element is the position (k,b) of that element within the reduced flow chart, or alternatively within the SUM-Graph 262 of the target process 250. Table 4 is an example of the implementation of the structure constituting the third dimension of SUM-Model for the elements of the SUM-Object set *, C or +.

TABLE 4

| Attributes |
|---|
| * ind ID/ loc,time BA tar.rec# rep.rec# SUM-S.rec# RBA |
| C |
| + |

Different attributes are assigned to different process addresses, depending upon the type of process element (i.e., A,L,D,W,E) that is positioned at this process address. Referring to Table 4, one member of the structure is populated with the type of process element. Another member of the structure contains ind, which is the index of the corresponding process element in the SUM-Frame and SUM-Graph.

Each element of the SUM-Model corresponds to an executable statement and contains three distinct attributes which establish a relationship between the target process 250, the SUM-Model 243, the SUM-Repository 246 and SUM-Source 247. Those attributes providing this relationship are: 1) a record number of the corresponding statement within the target process; 2) a record number of the corresponding statement within the SUM-Repository; and 3) a record number of the corresponding statement within the SUM-Source. Referring once again to Table 5, these three attributes are present in the structure members.

For each executable process element, the SUM-Model keeps an attribute of local time. Local time is an integer value of the occurrence of a statement within a target process. For example, the first time that a statement is executed during a program execution, the local time would be 1. The second time that the same statement is executed during a program execution, the local time would be defined as 2. The local time attribute is present as a structure member of the sample SUM-Model structure shown in table 4.

The binary address attribute is assigned to each process address of the SUM-Model. In Table 4, the binary address is shown as a structure member. Structures representing rewind terminals *,+,C also possess attributes of rewind ID (ID/) and Rewind Binary Address (RBA) representing the rewind entry of the rewind terminal. RBA of exit terminal is zero. The ID attribute is an alternative to the (k,b) coordinate pair in order to uniquely identify a process element. Each process element represented by a (k,b) coordinate pair in the SUM-Graph is represented by one integer value ID, where the integer is the numerical order of the element as it is encountered during a traversal of the two dimensional table on which the SUM-Graph is built in order of traversing columns, left to right. The ID of any particular element will be assigned a value defined by the following formula:

$$ID=((b-1)*k_{max})+k$$

where $k_{max}$ is the maximum value of the k dimension represented on the SUM-Graph.

Referring to SUM-Graph shown in FIG. 5(A), graph element *1 (k,b coordinate 10,1) has an ID of 10. Element L6 (k,b coordinate 8,5) has an ID of 76.

Table 5 shows the representative SUM-Model structure for a process element represented by the following SUM-Object set members, R and =.

TABLE 5

| Attributes |
| --- |
| R  ind  loc.time  BA  tar.rec#  SUM-S.rec# |
| = |

Exit terminals, when represented in the SUM-Model, and in Table 5 do not contain the following attributes of rewind terminals; Rep.rec#, Rewind ID (ID/) and RBA.

Process addresses containing process elements represented by the SUM-Objects A,L,D,E,W,X and S each have an ACB Pointer attribute. The ACB Pointer attribute is a pointer to a corresponding Analyzed Calculation Base construction that contains information on the history of approved execution events of the current process element.

In addition, structures representing L and D elements have an additional attribute which represents the increment in the b coordinate when traversed through their positive, or high potential solution. This corresponds to the shift potential previously described with respect to the SUM-Graph. For example, element L1 (k,b position 2,1) shown in FIG. 5(A) would have a shift potential of 6 recorded in its shift potential attribute field.

The Analyzed Calculation Base (ACB) 273 is a collection of structures, each corresponding to a different element of the target process 250. The information recorded within the ACB indicates the knowledge of correctness or uncertainty of the effects of different process addresses execution events at different times within the process.

FIG. 19 shows a number of ACB structures with each ACB construction corresponding to an executable process address of the target process 250. Every member or element of an individual ACB structure represents an event of a target process element execution.

In a present embodiment, the ACB pointer element of the SUM-Model previously described points to a binary file that is divided into two parts. The first part of the ACB structure is a control area that contains two distinct fields; Next Parameter Word (NPW) and Uncertainty Displacement Word (UDW). The NPW is only used for elements that have parameters, i.e., E and X. Referring once again to FIG. 19, an ACB structure for element A1 is shown as 1900. This ACB structure contains three fields, 1901, 1902 and 1903. The NPW is shown as 1901 and the UDW is shown as 1902.

The second part of the ACB structure, shown in FIG. 19 as 1903, is the information area which stores knowledge state bits. Each execution event of the element that is represented by this ACB structure is represented by a bit in the information area 1903. The position of a particular bit within the information area corresponds to the local time of the event. That is to say, the 20th bit of the information area 1903 corresponds to a local time of 20, or the 20th time that particular element was executed. The state of the binary digits (0 or 1) comprising the information area correspond to the current knowledge of the events effects correctness, where 1 represents a correct effect of an event occurrence and zero corresponds to an uncertain effect of an event. When an event is represented by zero in the ACB structure existing at some process time, it means that at that process time, the effect of the examined event is not known to be correct.

Those skilled in the art can readily appreciate that the monitoring of a target process 250 can generate enormous volumes of data even when recorded in a structure as simple as the ACB. While many forms of compression could be used, the present implementation UDW 1902 stores the relative displacement of the first bit that is in a zero state. For example, UDW 1902 contains the value 2000. This represents that the first bit position stored in information area 1903 is for a local time value of 2001 and that all 2000 previous events of that element execution were approved or disregarded as blank events, i.e., events which did not produce any results which were used subsequently.

Each parameter of an input statement (E) is represented by a ACB structure. Referring once again to FIG. 19, two parameters of an input statement are shown represented by two ACB structures 1905, and 1906. The NPW of 1905 points to structure 1906.

Similarly, each parameter of a call statement (X) is represented by an ACB structure. FIG. 19 shows three ACB structures 1907, 1908 and 1909 which correspond to three parameters of the call statement. The NPW of 1907 points to structure 1908. The NPW of 1908 points to 1909. The NPW of 1909 is empty since there is no next parameter in this CALL() statement.

Building the SUM-Repository

The SUM-Repository 246 of target process 250 is built at the same time as the SUM-Graph 262 or the SUM-Frame 261. Each element of the main branch of the target process that corresponds to an executable statement, i.e., represented by SUM-Object set members A, L, D, E, W, X and S, is stored in the SUM-Repository 246.

The size of the SUM-Repository 246 is less than the corresponding target process source code. This is because the SUM-Repository 246 does not contain any process control statements, therefore the SUM-Repository does not contain any unconditional branches, stop, return, then, else, endif, etc. The control structures are instead, preserved by the SUM-Builder 259 in the SUM-Model 243. To demonstrate how particular statements of target process 250 are represented in the SUM-Repository, consider the following examples.

If target process source 250 contained the statement:

if (d<10) go to label

The SUM-Repository 246 would contain the statement:

if (d<10)

Alternatively, if target process source 250 contained the following statements:

```
if (a .gt. b) then
    c = d
else
    e = f(g)
endif
return
```

The SUM-Repository 246 would contain:

if (a.gt.b)

c=d e=f(g)

Each statement of the SUM-Repository is referenced as the repository record number (rep rec.#) attribute of the corresponding process address within the SUM-Model. For example if the SUM-Repository is kept as a Relative Record Data Set (RRDS) then the repository record attribute of the process address within the SUM-Model must contain the relative record number of the corresponding statement within SUM-Repository 246.

Building the SUM-Source Code

Subsequent to the construction of the SUM-Graph 262, the SUM-Model 243 and the SUM-Repository 246, SUM-Source 247 is generated by the SUM-Source generator 249. This step is only done if the SUM is implemented in an embodiment which uses traditional object code.

The SUM-Source 247 provides a synchronization mechanism between the target process 250 and the SUM-Analytical Engine 244. This synchronization mechanism is implemented through the use of synchronization signals, which are inserted within the SUM-Source 247, by the SUM-Source Generator 249. In addition to the inserted synchronization signals, the SUM-Source 247 may differ from the target process 250 in that the SUM-Source 247 will not contain any unreachable or "dead" code.

The SUM-Source code 247 is built by the SUM-Source Generator 249 from two predecessor structures, the SUM-Repository 246 and the SUM-Model 243. Since the SUM-Source is built from the SUM-Model and the SUM-Repository which were built from the target process 250, there exists a functional equivalence between the target process 250, the SUM-Model 243 and the SUM-Source 247.

During the creation of the SUM-Source 247 by SUM-Source generator 249, the following steps are performed by the SUM-Source generator: 1) the contents of each executable statement which comprises the SUM-Source is taken from the SUM-Repository 246; 2) the control statements contained within the target process 250 which are now represented within the SUM-Model 243 are extracted from the SUM-Model; and 3) the target process 250—SUM-Model 243 synchronization signals are inserted into the SUM-Source 247.

Those skilled in the art can readily appreciate that the synchronization signals can be implemented through a variety of means. The synchronization signals inserted into the SUM-Source may consist of CALL() or WRITE() statements, which should be immediately familiar to those skilled in the art. The inserted synchronization signals provides the SUM-Interface 263 with three parameters. The three parameters are defined as (k,b,m) where k,b are the k,b coordinates that define the process address, and m defines the model of the target process.

Alternatively, this SUM-Interface 260 could be implemented with only two parameters. For example, instead of the (k,b,m) parameters one could pass only (ID,m) where ID is the unique identification of the element's process address which is calculated from the k,b coordinate as previously described.

The synchronization signal is inserted into the SUM-Source 247 by the SUM-Source Generator 249 during the construction of the SUM-Source for each statement representing a process terminal. As an example, consider the reduced flow chart shown in FIG. 4 which represents target process 250. The flow chart shows a terminal 411 at k,b coordinate 10,1 which represents a FORTRAN GOTO statement contained within target process 250.

When the SUM-Source Generator 249 constructs the SUM-Source for terminal 411 the following program statements are inserted within the program code:

call SUMI(10,1,1)

GOTO 'LABEL a'

The call SUMI() statement is made with three parameters as identified above. By way of an additional example, consider terminal 431 shown in FIG. 4. When the SUM-Source Generator constructs SUM-Source for terminal 431, the following program statements are inserted within the program code:

call SUMI(9,6,1)

GOTO 'LABEL e'

When CPU 241 executes either of the above synchronization signals, the three parameters are passed to the SUM-Interface 263. When the SUM-Interface receives the signal, it records the process address or ID of the calling terminal and the model identifier (m) within the system execution history 253.

While the present embodiment passes the three above parameters with the synchronization signal, an alternative embodiment would pass only two parameters with the synchronization signal. Since the element ID characteristic previously described uniquely identifies a process element and the ID is derived from the k,b coordinates of the process element, the process ID could be passed as a parameter to the synchronization signal instead of the k,b coordinate pair.

When implemented in this manner, the sequence of executed process terminals is sufficient information to allow the analyzer to recreate the target process 250 behavior for any given model of a target process.

This is because, within the model, there is only one pass between the START and a specific terminal or between an entry of a Rewind ID of the previous terminal and the next terminal. The Rewind ID has been stored as an attribute of each terminal represented within the SUM-Model 243.

The terminal which sent the synchronization signal is then located by the SUM-Interface in the SUM-Model through its k,b address.

When SUM-Interface 263 is signaled and the parameters associated with the signal are sent, the SUM-Interface invokes Analytical Engine 244 which retraces on the SUM-Model a part of the analyzed pass within the target process 250. The part retraced is from the Rewind ID of the previously executed terminal (or from the START, if the currently executed terminal is the first since the process was entered) to the current terminal. Each pass through a process address represents an execution event for that process address and the local time of that address is incremented by one.

By way of example, consider the execution where the following three CALL() instructions were made to the SUM-Interface during the course of an analysis.

```
CALL SUMI (10,1,1)

CALL SUMI (10,1,1)

CALL SUMI (9,5,1)
```

With reference to FIG. 5(A), these signals correspond to the execution of terminals mb1, mb1, and mb5 respectively. From this information, the analyzer determines that the target process 250 was executed through the path identified by the following elements in this order Entry, L1, /7, A1, /1, L2, A2, L3, X1, *1, L2, A2, L3, X1, *1, L2, A7, L6, R1 (Exit).

To represent repetition of the same terminal, as is often the situation with control loops structures comprising DO, FOR, While, etc., a negative number notation is used. For example, a notation 27 −5 42 would mean that a loop was passed through 6 times (reached the terminal with IDT=27) before exiting from the loop.

As may be appreciated by those skilled in the art, the synchronization statements could have been invoked after every element or after every exit of a logic condition. Our preferred embodiment minimizes the number of signals utilized to effectively represent the target process.

These above examples demonstrate that recording the target process execution history by recording the sequence of the executed process terminals is sufficient and the absolute minimum recording required to characterize the target process 250 dynamics.

In addition to the synchronization signal previously described that synchronize the execution (retracing) of SUM-Model necessary in this embodiment with the execution of the target process, two other types of synchronization signals are inserted into the SUM-Source by the SUM-Builder. Those other two signals allow the construction of the system input process synchronized map and incremented system output process synchronized map. Those two types signals are inserted immediately following system output statements (W) and immediately before system input statements (E). Synchronization of the system output does not invoke the SUM-Analytical Engine. Process synchronization at the system input is optional. Process synchronization at the system input, when performed, invokes the SUM-Analytical Engine and is performed in our preferred embodiment only because it is a convenient place to catch up with the target process by the SUM-Analytical Engine since the system input interrupts the target process anyway by the operator or user "think time".

With reference to FIG. 21B, system output synchronization is performed by 2152. Process synchronization at the system input is performed by 2153.

Incremented System Output Process Synchronized Map

The incremented system output process synchronized map (ISOPS) provides a mechanism to associate an output of a target process with the process events which produced that output. The ISOPS map 264 in its present embodiment consists of five fields, each containing an entry which defines a characteristic of the map.

Entry 1 defines a W-event as a set of {k,b,p,m} process parameters. {k,b} are the synchronization parameters associated with the signal sent to SUM-Interface 263. Parameter {p} is derived from the SUM-Model 243 of the target process 250. Parameter {p} is the current time attribute of the process element which corresponds to the {k,b} coordinate pair. The time attribute is obtained from the local time attribute kept by the SUM-Model incremented by one since this W event was not yet executed (retraced) in the SUM-Model in the traditional object code embodiment. In the SUM-Object code embodiment, where the SUM-Model drives the execution, the local time attribute will already be up to date and the retracing is not performed. Parameter {m} is the SUM-Model identifier.

Entry 2 defines the screen line and column position {sl,sc} at the beginning of each system output signal. The {sl,sc} entry is {1,1} for the very first W-event entry. When SUM-Interface 263 receives a synchronization signal sent by a W-event, SUM-Interface obtains the current screen position that is in effect after the execution of the W-event. The screen position so obtained is stored and later used as {sl,sc} entry for a next W-event.

Entry 3 defines the smallest rectangular area of the system output screen 258 {l1,c1,l2,c2} which represents the area of the screen changed by the W-event execution. This rectangular area is determined by comparing the previous screen image 255 that is saved at the process time after the previous W-event, and the current system output screen buffer 265.

Entry 5 contains the contents of the sysout screen buffer 265 that corresponds to the area defined in Entry 3. Entry 5 is contained in a variable length field and is stored in the present embodiment as a separate file, the Incremental Image Monitor File 267 (Shown as IIM file in FIG. 8).

Entry 4 is an integer which defines the displacement of Entry 5 from the beginning of IIM file 267.

Building System Input Process Synchronized Map

A system input process synchronized map (SIPS) map is built by the SUM during the course of the execution of the target process and may be later used by the SUM to analyze a specific input to the system made at some process time. The SIPS map is stored in system input history file 252. For each system input event an entry is made to system input history file 252. The entry so made consists of two records. The first record is the set of parameters {k,b,p,m} which describe the process time {k,b,p} and the model {m} corresponding to the current input string. The second record is the actual input string.

The SUM-Interface 263 creates the entry made to the system input history file 252 from the synchronization parameters (k,b,p,m) associated with a signal made to SUM-Interface 263 and the system input buffer.

Alternatively, from taking the system input values for the SIPS map from the system input buffer, these values could be taken from some other buffer where they were temporarily stored. They could be placed there by the statement inserted immediately after the system input statement and constructed from this input statement by simply changing READ to WRITE directed to the buffer. The remainder of the statement, i.e., its parameters and format, remain unchanged. As shown in FIG. 21(B), the READ(*,002)CH is followed by a WRITE(M,002)CH.

Figures 20A, 20B:
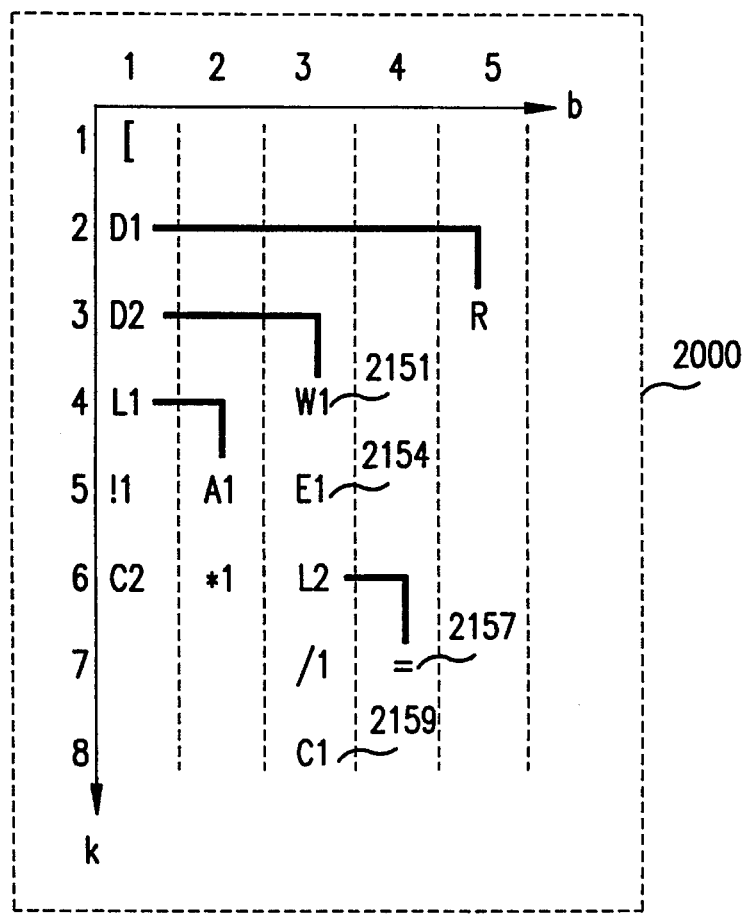
FIG. 20 shows an SUM-Graph, SUM-Repository of a sample process.

FIG. 21(B) shows an example of {ID,m} synchronization call 2153 that is made before an input from the terminal. The ID of this synchronization signal (21) is translated by SUM-Interface to k,b of 5,3 which corresponds to the process address containing the element E1 (2154 in FIG. 20(A)). If done as shown in the example, the system input is recorded by this means of statement 2155 to the input monitor buffer file 254. There could be several system input strings recorded in the system input monitor buffer by several E elements before the next terminal is met. During the next process synchronization signal performed at the process terminal (which in our example could be performed at =2157 or C1 2159 in FIG. 20(A)), the system input string entries are taken from the system input monitor buffer 254 and recorded in the system input history file 252. After that time, the system input monitor buffer could be reused.

Alternatively, if the keyboard buffer is used to create an entry in the system input history file (ISOPS file) the presence of the system input monitor buffer is not needed as well as inserting statements 2155 (FIG. 21(B)) within the SUM-Source. Instead, the signals which would read the keyboard buffer and make an entry to the SIPS map would be needed after each system input statement 2154 in FIG. 21(B).

Operational Examples of SUM

Delayed Sequential execution of the SUM-Model is implemented by one or more CPU(s) which execute the target process and the SUM-Analytical Engine. Synchronization between the execution of the target process and the SUM-Analytical engine takes place through synchronization signals that are placed within the target process by the SUM-Source generator. When the CPU executes such a synchronization signal, program control is transferred to the SUM-Analytical Engine. The target process execution is suspended for the duration of the signal. Target process execution resumes upon return from the signal.

Delayed parallel execution of SUM-Model is implemented through the use of multiple CPUs, where one of the multiple CPUs executes the target process and another of the multiple CPUs executes the SUM-Analytical Engine at the same time. Synchronization between the multiple CPUs takes place through any one of a variety of methods known in the art. The present invention only requires communication of the parameters {k,b,m} between CPU(s) working on the target process and CPU(s) working on the SUM-Analytical Engine analyzing the target process.

Figure 8B:
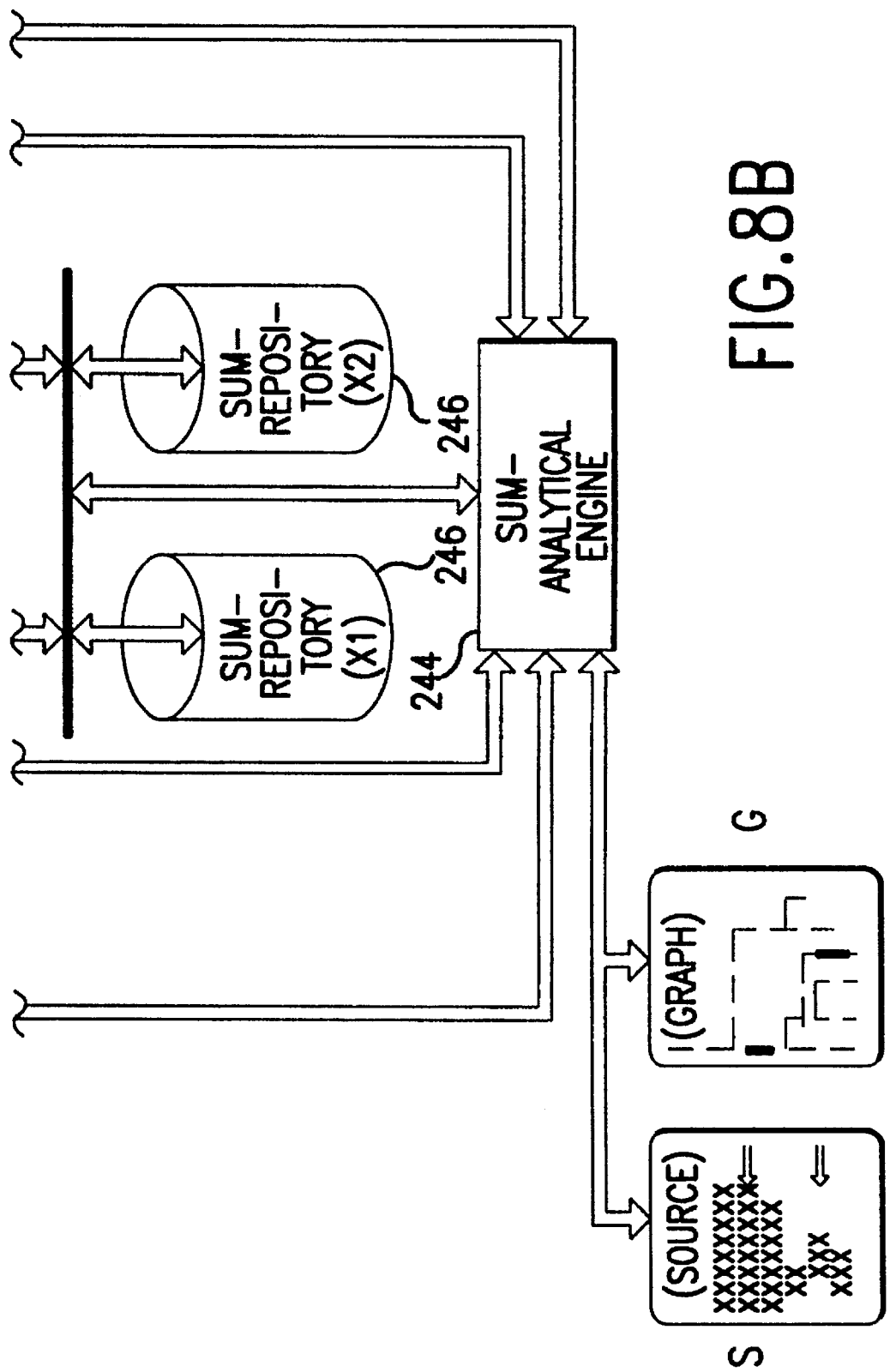
FIGS. 8A and B show the main components of the SUM-Machine eperating in the traditional object code implementation.

Referring to FIG. 8, both methods of execution of the SUM-Model are implemented through the use synchronization signals from process terminals {idt,m} and optionally, system input {ide,m}. The synchronization signals {idt,m} and optionally {ide,m}, bring the SUM-Model "up to date" with the target process. The synchronization signal {idw,m} is designed to bring ISOPS map "up to date" with the target process and Process Time within SUM-Model. The SIPS map is created either: 1) at the terminal synchronization points if the system input monitor buffer is used; or 2) by the synchronization signals performed after each system input statement.

When SUM-Interface 263 receives a synchronization signal that is implemented in the form {id,m}, the SUM-interface translates the {id} parameter of the corresponding model {m} into {k,b}. The process address {k,b} will point to one of the following: a process terminal {idt}; a system output signal {idw}; or an input from the terminal {ide}.

If the synchronization signal received by SUM-Interface 263 originated from system output element {idw,m}, SUM-Interface 263 initiates the process previously described which updates ISOPS map 264.

If SUM-Interface 263 receives an {idt} synchronization signal, the {idt} parameters are written into system execution history file 253.

Additionally, if the synchronization signal received by SUM-interface 263 is {idt,m} or in the alternative embodiment {ide,m}, SUM-Interface 263 then initiates SUM-Analytical Engine 244. Once initiated, SUM-Analytical Engine 244 will retrace the SUM-Model 243 from the point of the model at which a previous synchronization signal {k,b} was sent or from the entry point of the SUM-Model to the {k,b} of the current synchronization signal. As each element of the SUM-Model is traced, the time attribute {p} of that element is incremented by one, thereby keeping the SUM-Model 243 time current.

When an element is met that is a system output element (W), SUM-Analytical engine 244 initiates a knowledge induction process.

The SUM-Repository entry corresponding to the current (W) element is analyzed and each parameter of the W element initiates a cycle of knowledge induction chains. Each of these chains traces back events to their ancestors, up to knowledge propagation terminals.

Tracing backwards is analogous to, but in a different direction from the earlier explained principle of tracing the target process forward. It is done from the position of the present synchronization signal to the position of the previous synchronization signal. It is possible within the present SUM-Model construction which knows the rewind entry of each terminal.

The construction of event definition space of a W element that is terminated by knowledge propagation terminals is called knowledge induction.

Figure 25:
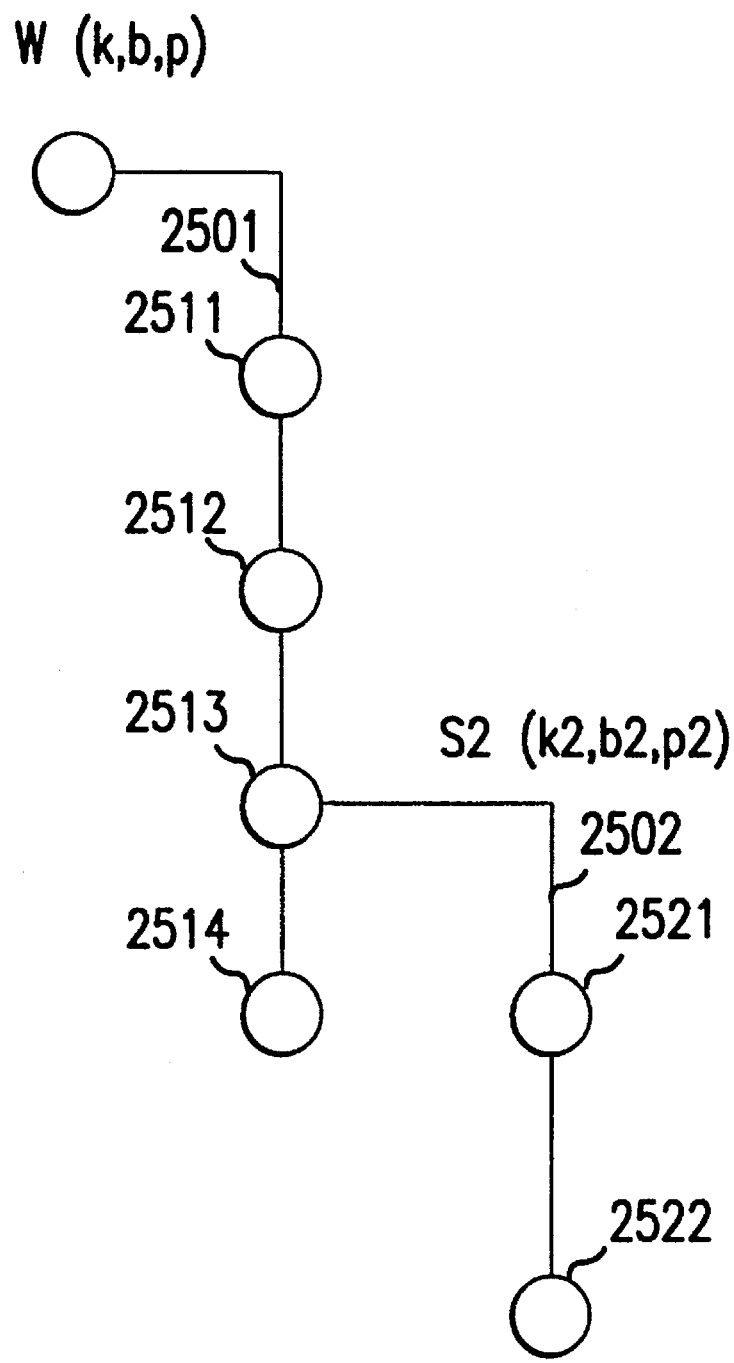
FIG. 25 shows the construction of event definition space terminated by knowledge propagation terminals.

The terminated event definition space is built with reference to FIG. 25. When the W element statement stored in the SUM-Repository is examined all of its variable parameters are identified. The branch 2501 is built. In the example shown in FIG. 25, there are four parameters, 2511, 2512, 2513, and 2514. Starting from the last one, 2514, the branch 2501 is retraced backwards, towards 2511. During the retracing, the SUM-Model is traced against the direction of execution between two events. Originally the first event is the event {kw,bw,pw} of W element execution. The second event is the event that defined the value of one of its parameters. In this example, 2514. Further with respect to FIG. 25, the parameter 2514 was produced by the knowledge propagation event that is either a previously approved event or an event that had no ancestors, i.e., system input event or initial data manipulation event. Therefore, this parameter 2514 did not produce a new branch.

Retracing the current branch backwards, parameter 2513 is encountered. The process event which produced the value of this parameter is identified by tracing the SUM-Model against the direction of execution from the event {kw,bw,p}. With reference to FIG. 25, this value was produced prior to {kw,bw,p} event by some statement s2 executed at the process time {k2,b2,p2}. The examination of the SUM-Repository entry of this statement identified the presence of two variables, 2521 and 2522.

Tracing back the model from {k2,b2,p2} to the events that defined the values of both parameters 2522 and 2521, the SUM-Analytical Engine finds that in the example of FIG. 25, the value of both of the parameters 2522 and 2521 prior to {k2,b2,p2} event, were defined by knowledge propagation terminals previously described. Therefore, new branches were not built for those parameters 2522 and 2521.

The branch 2502 therefore was the only branch representing the event definition space of the event {k2,b2,p2}. The SUM-Analytical engine is brought back to the branch 2501 and continues the examination backwards against the direction in which it was built. The next parameters examined would then be 2512. In our example the value of this parameter 2512 was determined to be produced by some knowledge propagation terminal event (KPT event) and therefore the branch that would represent its event definition space was not built.

SUM-Analytical Engine then retraces the current branch back to the parameter, 2511. In our example its value was also defined by KPT event.

The analysis of parameter 2511 concludes the analysis of the W-event {kw,bw,pw} terminated event definition space which in the example shown in FIG. 25, is defined by events that define the value of parameters located on the two branches 2501 and 2502. If, during the construction of event definition space we pass an event which was previously uncertain, in our example {k2,b2,p2}, its status is upgraded within the corresponding ACB structure.

Every time that an execution event status is upgraded from uncertain to correct by the knowledge induction process, a corresponding bit in the Analyzed Calculation Base structure 273 is updated from a value of 0 to a value of 1, thus increasing the knowledge of the ACB structure and therefore the knowledge of target process SUM-Model.

A user of the SUM views the system output that is recreated from the system result history by the Incremental image Extractor/Constructor 266. Operationally, the user positions a cursor, mouse or other pointing device at the system result. The system result so identified, corresponds to {k,b,p,m} parameters of the ISOPS map which defines the event of W element execution. By analyzing the pointing device position within the area defined by entry 3 of the ISOPS map, the corresponding parameter of that W element (system output statement) is defined.

If the so identified system output parameter result is defined by the user as unexpected and therefore incorrect, the SUM-Analytical Engine will start the knowledge deduction process.

Knowledge Deduction Process

Knowledge deduction is performed by a process identical to the knowledge induction process which builds the event definition space for the output events. The output events are traced back to their ancestors. This tracing is terminated in each direction by reaching knowledge deduction terminals which are the same as knowledge induction terminals, i.e., previously approved events or events that have no ancestors.

Unlike knowledge induction, there is no upgrading to the ACB structure knowledge during the knowledge deduction process. Instead, when a previously approved W-event is disapproved, the target process knowledge is dropped to the level, determined by the position of the disapproved W-owner event in the target process time as previously described.

There are two effects of the knowledge deduction process. First, there could be a loss of knowledge which is represented by changing the status of some process addresses from CPA to UPA. With reference to FIG. 16, when W owner event of element k,b was defined, its position on the ISOPS map was recorded as one of the attributes of that k,b address. When some other position within the ISOPS map is identified as a failure, SUM will change the status of addresses previously defined as CPA to UPA if their attributes representing W owner event position within ISOPS map point to a place within the ISOPS map representing a later or equal time as compared with the reference failure. This works because the ISOPS map is built in chronological order in one direction and the process time of the W event chronology is preserved in the ISOPS map.

Second, the position of possible faults or position of required modifications is determined as an area of uncertainty within the definition space of the system output result. This area of uncertainty is defined as those process addresses of this results event definition space that lie outside the correct algorithm space.

As can be fully appreciated by those skilled in the art, a target process is fully represented by its SUM-Graph and SUM-Model. In that regard, once the SUM-Graph, SUM-Model and SUM-Repository of a target process are generated by the SUM, there is no longer a need for the SUM-Source Generator, SUM-Source, the Compiler/Linker. The SUM can perform an execution and analysis of a target process without these above-mentioned components and therefore without the necessity for synchronization signals.

There are two embodiments which could be done. One embodiment uses an interpreter 268 that interprets statements contained within SUM-Repository 246 (shown in FIG. 18(C)). The order of the interpretation is controlled by SUM-Driver which is tracing i.e., executing, the SUM-Model 243 and therefore the target process is being controlled by the SUM-Model.

Another embodiment uses SUM-Object code which comprises the translated to object code elements of the SUM-Repository 246. The resulting code, therefore does not contain any control elements such as logic conditions, loop conditions, conditional or unconditional GOTO, RETURN, STOP, or loop terminals. The conditional statements are represented in SUM-Object code only by the expressions to be evaluated. In this embodiment as well as the embodiment which uses an interpreter, the control of the target process is performed by the SUM-Driver tracing (executing) the SUM-Model. In the SUM-Object code embodiment, the SUM-Model becomes a part of the object code as it is traditionally understood since the SUM-Model performs the control Functions.

Since the SUM-Model is controlling the process execution the SUM-Model does not need to be informed of the active event in the target process. Therefore, the process synchronization signals are not needed. The only function of the SUM-Interface in these two embodiments is to create the ISOPS and SIPS maps.

Figure 18A:
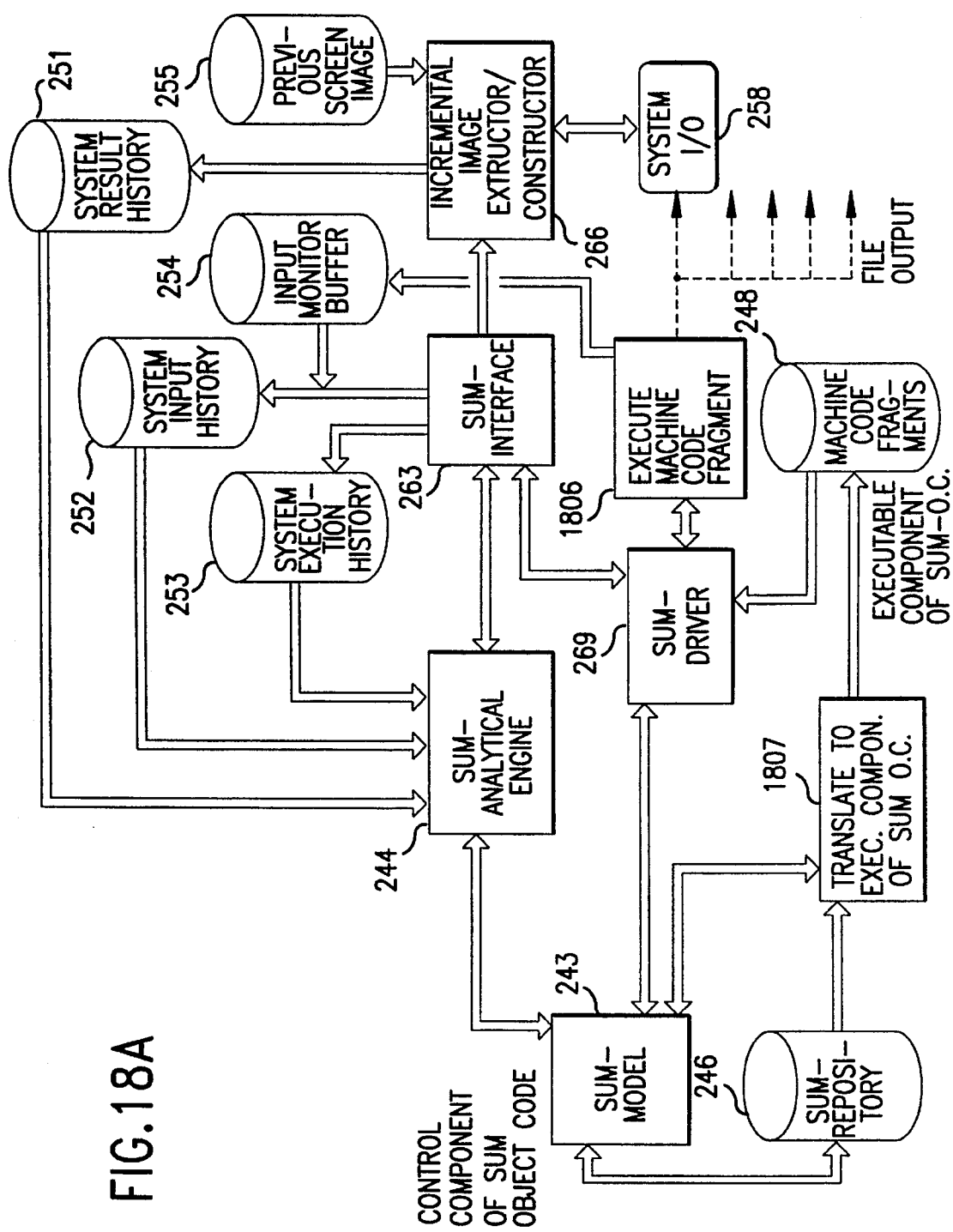
FIG. 18 shows the execution of SUM-Object code, the mwo components which comprise SUM-Object code and the interpretation of the SUM-Repository by the SUM-Model.
Figure 18B:
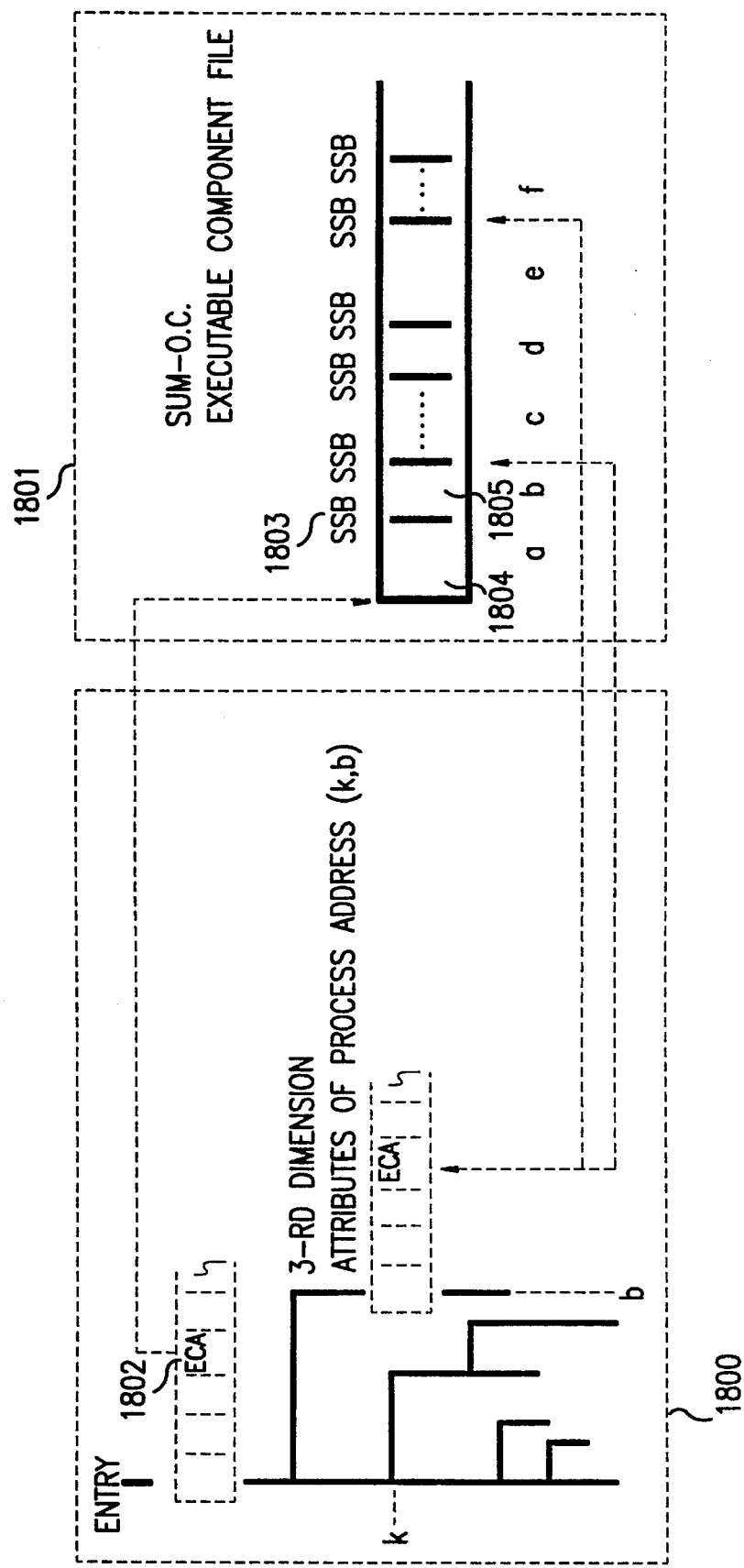
Figure 18C:
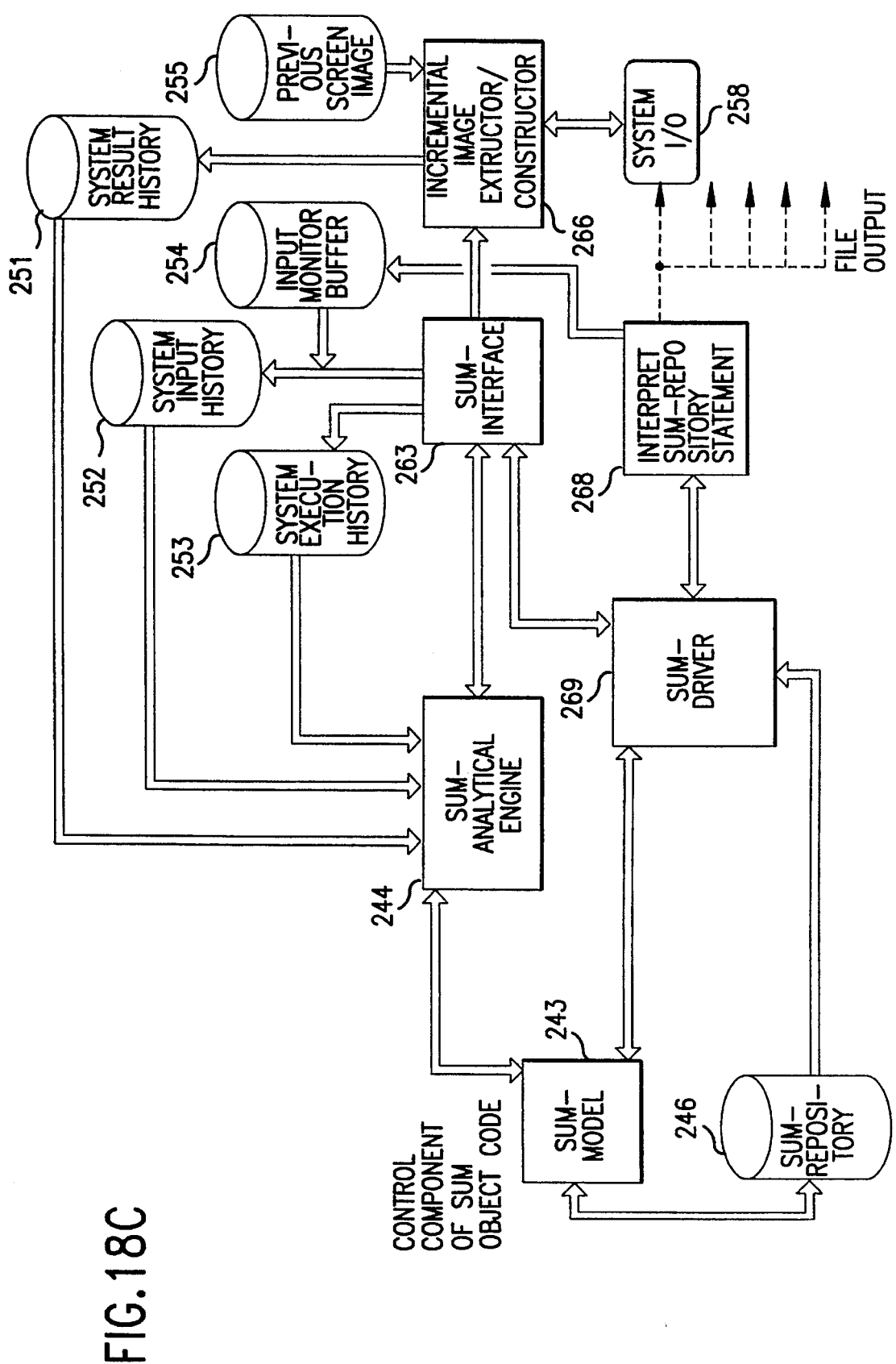

With reference to the SUM-Object code embodiment shown in FIG. 18(A) and FIG. 18(B), two components of the SUM-Object code are shown. Shown in FIG. 18(B) are a control component 1800 and an executable component 1801. The control component 1800 has a pointer 1802 to a segment 1804 within the executable component. Each segment within the executable component represents a statement of the SUM-Repository that has been translated into object code.

The Executable Component Address (ECA) attribute 1802 is added to each executable element PA of the SUM-Model. Each segment i.e., 1804, is followed by the Statement Separator Byte (SSB) 1803. SUM-Driver 269 reads the value of ECA from SUM-Model 243, reads the corresponding segment of object code 1803 and passes it to the CPU 241 which is located within 1806, that runs the executable component of SUM-Object Code.

As one of different methods for monitoring system input, the following is implemented: when module 1807 translates a statement representing input from the system terminal into Executable Component of SUM-Object Code, it adds a next statement, that reverses the action of an input from a system terminal to output to the input monitor buffer file 254. For example and with reference to FIG. 21(B), READ (* ,002)CH 2154 is followed by WRITE(M,002)CH 2155.

SUM-Driver then has an option to activate or deactivate this second statement in order to control monitoring of the system input while selecting the next code fragment to be passed to the module 1806.

Since the SUM-Object code architecture consists of two components, control and control-less, this architecture allows for easier modification of the target process. When the change needed is a control change, the control component is changed. When the change needed is a non-control component, a new entry is made in the executable component file and the ECA reference in the control component is updated.

The resolution of the link between the control and non-control components through the ECA is done at a run time. Therefore compiling, recompiling or interpreting is needed only for newly created or modified statements of the non-control component of SUM-Object Code. It is even possible for the interpreter to be invoked only for the newly created or modified statements. This includes those situations where the newly created or modified statement is just a single statement.

The control component of SUM-Object Code can be rearranged by insertion, deletion or modification to the SUM-Model element corresponding to the newly created SUM-Repository element. In some situations, when only the control structure needs to be rearranged, a modification to SUM-Object Code can be made without any changes being made to the non-control component. This is done by rearranging the order of the elements within SUM-Model.

Modification to the SUM-Object code can be done in some situations by deactivating an element of the control component and, therefore, bypassing the corresponding element of the non-control component. Further, if the resolution of the links between the Control and non-control SUM-Object code components is performed at run time, linking or re-linking of a group of two or more target processes implemented by SUM-Object Code is done by linking only the control components of the SUM-Object Code.

Result Oriented Programing

The SUM can address any event of any statement execution through the reference to the system results by using a system pointing device or cursor. Therefore, while building the event definition spaces of the system results, there exists a way to automatically build upon or modify the target process.

The event definition space of system result events or the event definition space of an intermediate value calculation event could be reused to create new system results or conditions for new system results. The system results could be rearranged in the process time that corresponds to the system results.

This serves as the basis for the method of Result Oriented Programming (ROP) that is, a very high level language for forward development of a software process. In fact the level of this language grows with the forward development of the target process, since there are more and more events to analyze and more event definition spaces to reuse.

Program Stethoscope

Audio analysis, combined with traditional video analysis allows for better dynamic understanding of programs or system of programs. Execution of any target process can be seen as it is traditionally done by tracing the graph dynamically, but it also can be heard, if one generates sound pitches which correspond to statement positions within the SUM-Graph. Generated this way, "music" would be defined by the process algorithm and is a function of the input data combination.

During the cognitive process of program understanding we are faced with a task of "playing computer". This is by definition a dynamic process. On the other hand a graph (picture) is by definition a static object. The difference between a graphical and sound representation of dynamic process may be understood by comparing two ways of recreating music: 1) by reading the music score (graphic representation); and 2) by actually playing the music, or hearing it when looking at the score.

Audio effect during a program analysis can be achieved as follows. During parallel or post-life program emulation by applying next recorded terminal address {k,b} to the SUM-Model of the program we can trace the program execution on the SUM-Graph of the program algorithm.

The audio effect is added by calling the hardware internal function that allows the generation of an audio frequency and sending it to the speaker. A head phone will be a more appropriate addition to the computer when analyzing a system by the described method, and will not affect other programmers.

The frequency can be calculated as a function of two parameters, (k,b), where a single increment in {k} increments the frequency by one discrete step, and a single increment of {b} increments a frequency by a larger step, for example by an octave. A branch back will accordingly decrement the frequency.

The duration of beep, corresponding to the tracing of one individual element of the SUM-GRAPH can be set as such that it would be recognized by the human ear. The effect of such audio execution emulation is such, that each process of program execution has its own "music", depending on that process algorithm structure and input data combination. In the case of emulating a loop having a large number of iterations, a code signal can be set to indicate such a loop in order to eliminate a necessity of tracing all the iterations. This code can be for example represented by longer duration signal, followed by different duration signals, each representing let say 10 iterations of the loop. In addition, a graph depicting the process may be made and as each element is executed, the corresponding portion of the graph is highlighted and its characteristic tone is played.

When a particular output result is not being observed for a long time, this analysis can be activated to hear: 1) whether the system is dead; 2) whether the program in loop; 3) or is it waiting for an input. When the last executed element was an input statement a special audio tone can be generated Most stressful places of the program's algorithm can be heard as a most common frequency and therefore easily identified and the difference in program behavior with different input data combinations can be heard.

A special tone can indicate a call to a child function and a special tone can indicate a return from the call. The audio analysis can be limited to only those signals originally and expanded optionally to indicate process execution within one specific function, if functionality within the function is to be studied.

The Audio analysis can be recorded during the process emulation (alive or post-life) and then replayed without the actual mode emulation in both directions forward and backward.

It can be replayed synthesized with the replay of the system result and thus give a filling of the intensity of the processing necessary for those results achievement;

It can be recorded and replayed for different input data combinations for the same process in order to analyze the difference in intensity of calculations for those different input situations. Given that the potential for the program fault is a function of the number of the elementary processes involved, this analysis will aid in selection simpler (input-process-output) combination during system evolution to a new specifications.

Although various embodiments which incorporate the teachings of the present invention have been shown and described in detail herein, those skilled in the art can readily devise many other varied embodiments that still incorporate these teachings.

I claim:

1. An apparatus for automatic analysis of a target process, wherein the apparatus determines the location of faults contained within the target process or location of modifications within the target process required due to a changed expectation of the result, wherein the apparhtus generates a secondary process of accumulating knowledge of the target process functionality though knowledge induction, comprising:

an analyzed calculation word attribute for each executable element of the target process;

means for executing the target process and said secondary process, means for said secondary process to build and propagate an elementary knowledge of the target process functionality through knowledge induction that propagates said elementary knowledge through a place and time within the target process, wherein said elementary knowledge indicates a knowledge about or an uncertainty about the correctness of an effect of the target process element execution event and, wherein said elementary knowledge is recorded within said analyzed calculation word and, wherein the location of fault or location of modification within the target process required due to the changed expectation of the result is obtained through knowledge deduction.

2. The apparatus of the claim 1, wherein the target process is implemented by execution of code in traditional object code form, while synchronization signals are sent from the target process to said secondary process.

3. The apparatus of the claim 1, wherein the target process is implemented by a driver tracing a model of the target process and presenting corresponding executable elements of the target process represented in their source code form to a language interpreter, while said secondary process is activated by said driver.

4. The apparatus of the claim 1, wherein the target process is implemented by a driver tracing a model of the target process and presenting corresponding executable components of SUM object code to the computer operating system, while said secondary process is activated by said driver.

5. The apparatus of the claim 1, further comprising means for constructing the definitions of modifications within the target process, required due to the changed expectation of the result, wherein said definitions are obtained by reusing event definition spaces of the prior results of the target process.

\* \* \* \* \*

UNITED STATES PATENT AND TRADEMARK OFFICE
CERTIFICATE OF CORRECTION

PATENT NO.  : 5,522,036

DATED       : May 28, 1996

INVENTOR(S) : Benjamin V. Shapiro

It is certified that error appears in the above-indentified patent and that said Letters Patent is hereby corrected as shown below:

On the title page: Item [73] Assignee, should be corrected such that "Benjamin V. Shapiro" is replaced by --Thinking Software, Inc.";

Figure 24 box 273, change "ANALYZED CALCUALTION" to --ANALYZED CALCULATION--;

Column 6, line 55, change "Duilt" to --built--;
Column 8, line 36, change "ogic" to --logic--;
Column 9, line 57, change "Uerminate" to --terminate--;
Column 10, line 24, delete "is";
Column 11, line 40, change "axis" to --axes--;
Column 12, line 58, change "ihogic" to --logic--;
          line 61, change "tube" to --the--;
Column 14, line 40, change "effecting" to --affecting--;
           line 64, change "effected" to --affected--;

UNITED STATES PATENT AND TRADEMARK OFFICE
CERTIFICATE OF CORRECTION

PATENT NO. : 5,522,036
DATED : May 28, 1996
INVENTOR(S) : Benjamin V. Shapiro

It is certified that error appears in the above-indentified patent and that said Letters Patent is hereby corrected as shown below:

```
Column 18, line 57, change "exit[" to --exit"--;
Column 21, line 2, insert --.-- after time;
Column 22, line 17, change "events" to --event's--;
           line 59, change "stabilize" to --stabilizes--;
           line 60, change "prevent" to --prevents--;
Column 30, line 44, delete the first occurrence of "map";
Column 37, line 35, change "apparhtus" to --apparatus--; and
           line 37, change "though" to --through--.
```

Signed and Sealed this

Seventh Day of January, 1997

Attest:

BRUCE LEHMAN

*Attesting Officer*   Commissioner of Patents and Trademarks